US012640032B2

(12) United States Patent
Golestani et al.

(10) Patent No.: US 12,640,032 B2
(45) Date of Patent: May 26, 2026

(54) SYSTEMS AND METHODS FOR PREEMPTIVE COMMUNICATION OF ROAD CONDITION DATA

(71) Applicant: KONEKX, Kearny, NJ (US)

(72) Inventors: Reza Golestani, Kearny, NJ (US); Reza Mousavian, Kearny, NJ (US)

(73) Assignee: KONEKX, Kearny, NJ (US)

( * ) Notice: Subject to any disclaimer, the term of this patent is extended or adjusted under 35 U.S.C. 154(b) by 39 days.

(21) Appl. No.: 18/860,564

(22) PCT Filed: Apr. 26, 2023

(86) PCT No.: PCT/US2023/019894
§ 371 (c)(1),
(2) Date: Oct. 25, 2024

(87) PCT Pub. No.: WO2023/211994
PCT Pub. Date: Nov. 2, 2023

(65) Prior Publication Data
US 2025/0329252 A1      Oct. 23, 2025

Related U.S. Application Data

(60) Provisional application No. 63/336,162, filed on Apr. 28, 2022, provisional application No. 63/336,165, (Continued)

(51) Int. Cl.
*G08G 1/01* (2006.01)
*G08G 1/017* (2006.01)
(Continued)

(52) U.S. Cl.
CPC ......... *G08G 1/0116* (2013.01); *G08G 1/0175* (2013.01); *G08G 1/164* (2013.01); *H04W 4/38* (2018.02); *H04W 4/44* (2018.02)

(58) Field of Classification Search
CPC .... G08G 1/0116; G08G 1/0175; G08G 1/164; H04W 4/38; H04W 4/44
See application file for complete search history.

(56) References Cited

U.S. PATENT DOCUMENTS 10,466,716 B1      11/2019   Su et al.
2020/0168081 A1      5/2020   Ran et al.

FOREIGN PATENT DOCUMENTS

WO      WO-2020/264478 A1      12/2020

OTHER PUBLICATIONS

International Search Report and Written Opinion on PCT App. PCT/US2023/019894 dated Sep. 5, 2023 (18 pages).
(Continued)

*Primary Examiner* — Aryan E Weisenfeld
(74) *Attorney, Agent, or Firm* — Foley & Lardner LLP

(57) ABSTRACT

A system and method for communicating road condition data. The system and method includes a plurality of interchangeable housings, including a sensor housing comprising a sensor configured to generate sensor data; a data processing housing comprising a processor configured to receive the sensor data and vehicle-originated data, and apply one or more layers of a machine learning architecture to the sensor data and the vehicle-originated data to generate at least a portion of vehicle instruction data; and a wireless communication housing comprising a wireless interface circuit configured to receive the vehicle-originated data and to transmit the vehicle instruction data generated by the processor.

20 Claims, 7 Drawing Sheets

Related U.S. Application Data filed on Apr. 28, 2022, provisional application No. 63/336,161, filed on Apr. 28, 2022.

(51) Int. Cl.
    *G08G 1/16*        (2006.01)
    *H04W 4/38*       (2018.01)
    *H04W 4/44*       (2018.01)

(56)                 References Cited

OTHER PUBLICATIONS

Invitation to Pay Additional Fees for PCT App. PCT/US2023/019894 dated Jul. 7, 2023 (2 pages).

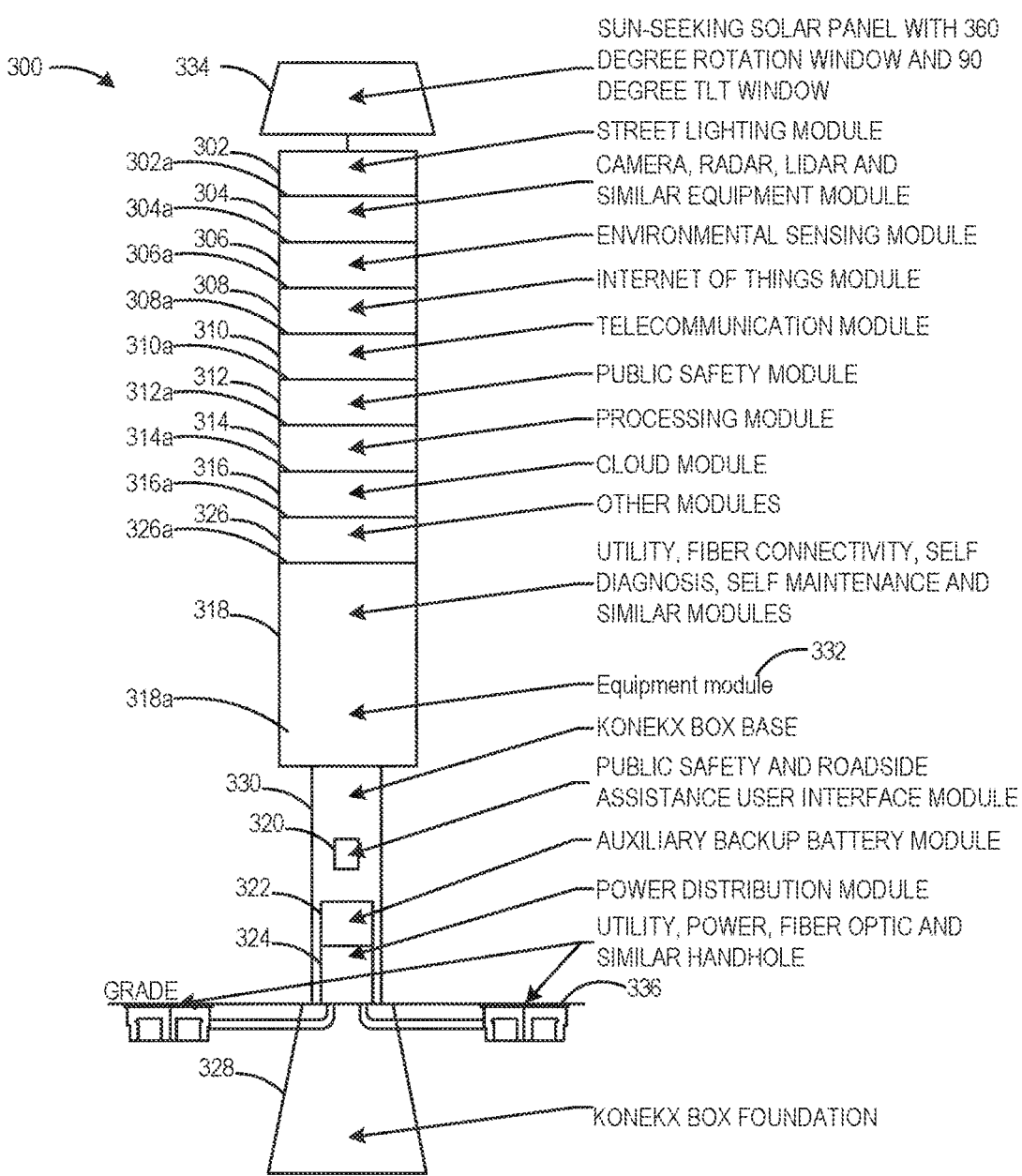

300

334 — SUN-SEEKING SOLAR PANEL WITH 360 DEGREE ROTATION WINDOW AND 90 DEGREE TLT WINDOW

302a — 302 — STREET LIGHTING MODULE

304a — 304 — CAMERA, RADAR, LIDAR AND SIMILAR EQUIPMENT MODULE

306a — 306 — ENVIRONMENTAL SENSING MODULE

308a — 308 — INTERNET OF THINGS MODULE

310a — 310 — TELECOMMUNICATION MODULE

312a — 312 — PUBLIC SAFETY MODULE

314a — 314 — PROCESSING MODULE

316a — 316 — CLOUD MODULE

326a — 326 — OTHER MODULES

318 — UTILITY, FIBER CONNECTIVITY, SELF DIAGNOSIS, SELF MAINTENANCE AND SIMILAR MODULES

332 — Equipment module

318a — KONEKX BOX BASE

330 — PUBLIC SAFETY AND ROADSIDE ASSISTANCE USER INTERFACE MODULE

320 — AUXILIARY BACKUP BATTERY MODULE

322 — POWER DISTRIBUTION MODULE

324 — UTILITY, POWER, FIBER OPTIC AND SIMILAR HANDHOLE

GRADE

336

328 — KONEKX BOX FOUNDATION

FIG. 3

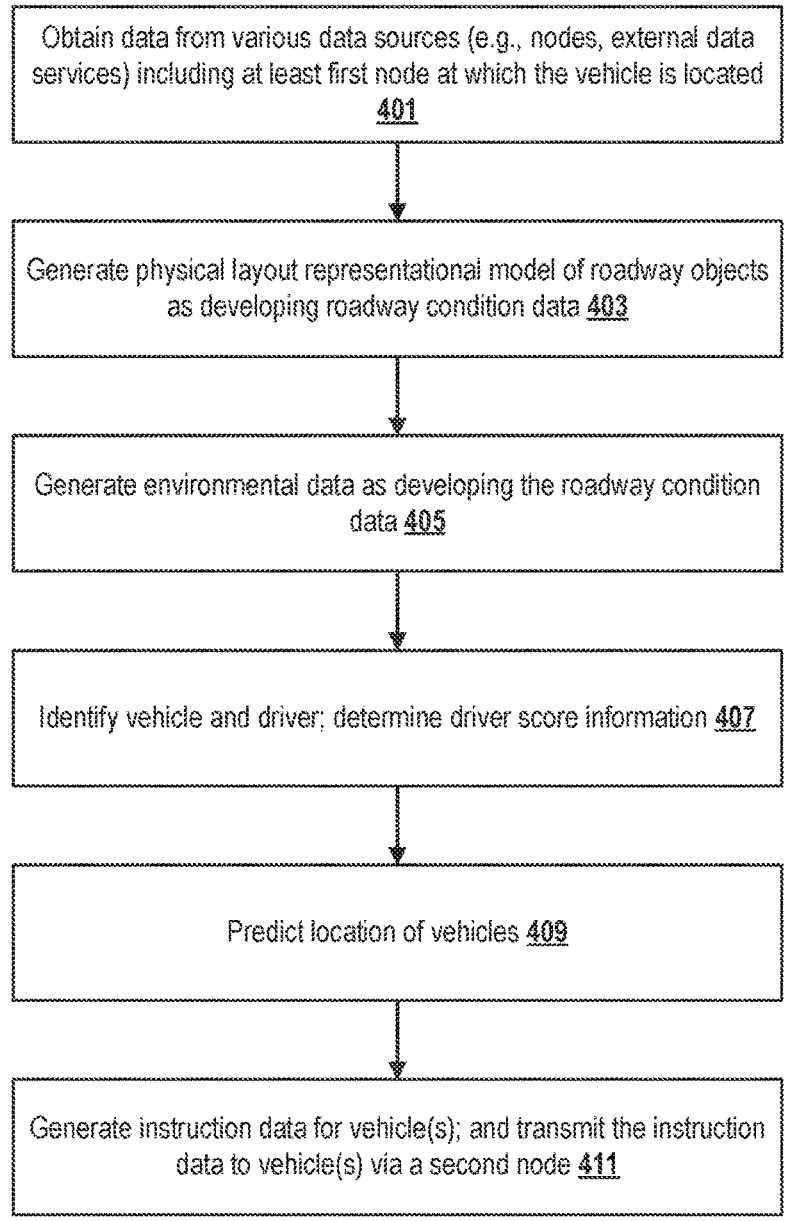

Obtain data from various data sources (e.g., nodes, external data services) including at least first node at which the vehicle is located
401

Generate physical layout representational model of roadway objects as developing roadway condition data 403

Generate environmental data as developing the roadway condition data 405

Identify vehicle and driver; determine driver score information 407

Predict location of vehicles 409

Generate instruction data for vehicle(s); and transmit the instruction data to vehicle(s) via a second node 411

FIG. 4

Establish wireless connection with vehicle; and receive vehicle data from the vehicle 501

Transmit vehicle detection message to server 503

Receive and forward roadway data and sensor data from onboard modules 505

Receive and forward instruction data 507

SYSTEMS AND METHODS FOR PREEMPTIVE COMMUNICATION OF ROAD CONDITION DATA

CROSS-REFERENCE TO RELATED APPLICATIONS

This application claims priority to U.S. Provisional Application No. 63/336,161, filed Apr. 28, 2022, which is incorporated by reference in its entirety.

This application claims priority to U.S. Provisional Application No. 63/336,162, filed Apr. 28, 2022, which is incorporated by reference in its entirety.

This application claims priority to U.S. Provisional Application No. 63/336,165, filed Apr. 28, 2022, which is incorporated by reference in its entirety.

This application is a U.S. National Phase Application under 35 U.S.C. § 371 of International Application No. PCT/US2023/019894, filed Apr. 26, 2023, which is incorporated by reference in its entirety.

TECHNICAL FIELD

This application relates generally to systems and methods for wirelessly communicating with vehicles and/or controlling autonomous vehicles and autonomous driving using roadside nodes that collect information from environmental sensors and the vehicles themselves.

BACKGROUND

For the past few decades, companies have been striving to improve the safety of motor vehicles on the highway. Car crashes and fatalities that result from such crashes have continued to be a problem in society since cars first rolled onto the road. The problem has only increased as cars are traveling faster and drivers are facing an increasing number of distractions. Phone calls, texting, and the radio are only a few examples of distractions drivers face when they are on the road. The automobile industry is attempting to keep up with the increased speed and number of distractions by improving the crash safety ratings of their vehicles and by implementing safety measures in the vehicles to keep drivers focused on the road, such as implementing sensors to keep users' eyes on the road or users' hands on the driving wheel. However, drivers often find workarounds to avoid complying with these safety measures. Further, even if the added safety measures prove to be effective, drivers can still make mistakes when driving or encounter unforeseeable events that can result in an accident.

The onset of autonomous vehicles has provided more recent attempts to improve highway safety. Different companies are implementing different versions of self-driving cars in which cars have internal processors that can control the cars' speed and turning based on data generated by sensors on the cars. These self-driving cars are repeatedly running into issues resulting from not having enough information available to make the correct control decision based on the cars' sensor data. These issues often occur when the data that is necessary to make the correct decision is undetectable as being out of range or as being obstructed from the sensors on the car. Accordingly, car manufacturers often force drivers to continue watching the roadway even while operating in an "autonomous" mode to account for any improper decisions that the cars' processors make. This solution can again require drivers to pay attention to the road and rely on the drivers to drive their vehicle, resulting in the same problems autonomous vehicles were supposed to solve.

SUMMARY

Described herein are systems and methods for overcoming the aforementioned technical deficiencies by operating a private network infrastructure on the roadways and highways. The private network infrastructure may involve a series of roadside nodes with processors and sensors that can communicate with each other, vehicles on the road, and a remote server (e.g., a cloud server). Roadside nodes may collect data through their sensors about the roadway and cars on the roadway and send the data to the remote server for processing. The remote server may receive and execute layers of machine-learning architecture applied on the data to make predictions about the environment and different types of information to provide the vehicles on the roadway. Because the cloud server collects data from roadside nodes that are dispersed throughout the roadway, the cloud server can make predictions and provide information about the road conditions to the vehicles using data that could not be available to vehicles with a much more limited view of the road. With this information, the vehicles may automatically operate to otherwise avoid unexpected objects in the middle of the road or reckless drivers that may cause a danger to others. In this way, the described systems and methods may improve highway safety.

To implement the systems and methods described herein, the roadside nodes may each implement a series of interchangeable housings (e.g., physical modules that can be removed and replaced inside the roadside nodes) that are dedicated to specific tasks. For example, a roadside node may include an environmental sensor module that detects environmental data about the environment surrounding the roadside node (e.g., the weather around the roadside node) as well as roadway data about the condition of the roadway. The roadside node may also include a two-way wireless communication circuit in a separate module that the roadside node can use to receive and send signals to vehicles while they are on the road. The roadside node may connect with vehicles as they pass the roadside node to enable the roadside node to communicate information about the roadway environment to the vehicles to help optimize autonomous operation of the vehicles.

When a roadside node detects a vehicle, the roadside node may transmit data about the vehicle (e.g., location data) and environmental data to a remote server to analyze the data in real-time. When doing so, the remote server may execute functions and algorithms of a machine-learning architecture that first assesses the potential driver and the vehicle's route. Based on the analysis, the algorithm may generate a set of vehicle instruction data and, through the roadside node or another roadside that has a connection with the vehicle, feed the vehicle instruction data to the vehicle. Because the vehicle is configured to receive such data, the vehicle may receive and operate according to the received data. The roadside node and/or the remote server may continuously repeat this process in real-time with vehicles as they pass by the roadside node, thereby enabling such vehicles to autonomously navigate to their destination in an optimized manner.

In some embodiments, a system for communicating road condition data comprises a node housing including a plurality of shelving units. The node housing comprises a first shelving unit electrically connected to a removable sensor housing comprising a sensor configured to generate sensor data; a second shelving unit electrically connected to a removable data processing housing comprising a processor configured to receive the sensor data and vehicle-originated data and apply one or more layers of a machine learning algorithm to the sensor data and the vehicle-originated data to generate at least a portion of vehicle instruction data; and a third shelving unit electrically connected to a removable wireless communication housing comprising a wireless interface circuit configured to receive the vehicle-originated data and to transmit the vehicle instruction data generated by the processor.

In some implementations, the wireless interface circuit is configured to receive the vehicle-originated data from a first vehicle and transmit the vehicle instruction data to the first vehicle.

In some implementations, receiving the vehicle instruction data causes the first vehicle to change a state of operation.

In some implementations, the node housing is further configured to receive a removable lighting housing comprising a light. The removable lighting housing is positioned on a highest shelf of the plurality of shelves.

In some implementations, the processor is configured to: establish a connection with a vehicle upon receipt of a connection request from the vehicle; receive the vehicle-originated data from the vehicle over the connection; and transmit the vehicle instruction data to the vehicle over the connection.

In some implementations, the processor is configured to, upon establishing the connection with the vehicle, query a database for an indication as to whether the vehicle is configured to provide vehicle-originated data to the processor; and transmit a request for vehicle-originated data about the vehicle responsive to the query indicating the vehicle is configured to provide vehicle-originated data.

In some implementations, the processor is configured to receive the sensor data from the sensor; and transmit the sensor data to a remote computing device.

In some implementations, the plurality of interchangeable housings further comprises a fiber connectivity module including fiber optic cabling. The processor is configured to transmit the sensor data to the remote computing device via the fiber optic cabling.

In some implementations, the processor is configured to receive a second portion of vehicle instruction data from the remote computing device. The second portion of the vehicle instruction data is generated based at least on the sensor data.

In some implementations, the wireless interface circuit is configured to transmit the vehicle instruction data to a vehicle by transmitting an indication of an upcoming obstacle to the vehicle.

In some implementations, the processor is configured to receive the sensor data and vehicle-originated data, and apply the one or more layers of the machine learning algorithm to the sensor data and the vehicle-originated data to determine a vehicle profile or a driver profile of a vehicle.

In some implementations, the processor is configured to apply the one or more layers of the machine learning algorithm to the sensor data and the vehicle-originated data to generate at least a portion of vehicle instruction data indicating an object that is outside a field-of-view of the sensor.

In some implementations, the node housing further comprises one or more fourth shelving units each electrically connected to one or more pieces of equipment and configured to provide fiber optic connectivity to the one or more pieces of equipment.

In some implementations, the processor is configured to determine an identity of the driver based upon an identity of a first vehicle and the one or more attributes of driver behavior.

In some embodiments, a method for communicating road condition data at roadside data collection nodes. The method comprises generating, by a sensor of a removable sensor housing of a roadside node, sensor data; receiving, by a processor of a removable data processing housing of the roadside node, the sensor data from the sensor; receiving, by the processor, vehicle-originated data from a vehicle a wireless interface circuit of a removable wireless communication housing of the roadside node; generating, by the processor, at least a portion of vehicle instruction data by applying one or more layers of a machine learning algorithm on the sensor data and the vehicle-originated data; and transmitting, by the computer, the vehicle instruction data to the vehicle via the wireless interface circuit.

In some implementations, the vehicle instruction data causes the vehicle to change a state of operation.

In some implementations, the method further includes establishing, by the processor, a connection with the vehicle in response to receiving a connection request from the vehicle, wherein the processor receives the vehicle-originated data from the vehicle over the connection, and wherein the processor transmits the vehicle instruction data to the vehicle over the connection.

In some implementations, the method further includes, upon establishing the connection with the vehicle, querying, by the processor, a database for an indication as to whether the vehicle is configured to provide vehicle-originated data to the processor; and transmitting, by the processor, a request for prior vehicle-originated data about the vehicle responsive to the query indicating that the vehicle is configured to provide vehicle-originated data.

In some implementations, the method further includes transmitting, by the processor, the sensor data to a remote computing device.

In some implementations, the method further includes receiving, by the processor, a second portion of vehicle instruction data from the remote computing device. The second portion of vehicle instruction data is generated based at least on the sensor data.

In some embodiments, a system for communicating road condition data. The system comprises a non-transitory computer readable medium containing instructions that when executed by a processor cause the processor to receive vehicle data associated with a first vehicle from a first node of a plurality of nodes defining a mesh network; receive sensor data from a second roadside node of the plurality of nodes; apply one or more layers of a machine learning algorithm to the sensor data and the vehicle data associated with the first vehicle to generate vehicle instruction data for the first vehicle; and transmit the vehicle instruction data for the first vehicle to one or more roadside nodes of the plurality of nodes, wherein the vehicle instruction data contains instructions to cause the one or more roadside nodes to forward the vehicle instruction data to the first vehicle.

In some implementations, the processor is configured to transmit the vehicle instruction data to the one or more nodes by transmitting the vehicle instruction data to a third node located geographically between the first node and the second node.

In some implementations, the processor is configured to transmit the vehicle instruction data to the one or more nodes by transmitting an indication of an obstacle that is detectable by sensors of the second node but not by any sensors of the first node.

In some implementations, the processor is configured to transmit the vehicle instruction data to the one or more nodes by transmitting the vehicle instruction data to a third node located geographically between the first node and the second node.

In some implementations, the processor is further configured to receive a first indication of a driver of a second vehicle from the first node; and receive a second indication of the driver of the second vehicle from the second node.

In some implementations, the processor is further configured to store a driving pattern for a driver profile of the driver and a vehicle profile of the second vehicle in a database.

In some implementations, the processor is configured to generate the driving pattern by assigning a first time stamp and a first location to the driving pattern based on the first indication and a second time stamp and a second location to the driving pattern based on the second indication.

In some implementations, the processor is configured to receive the vehicle data associated with the first vehicle by receiving vehicle-originated data from the first vehicle.

In some embodiments, a method for communicating road condition data. The method comprising receiving, by a processor, vehicle data associated with a first vehicle from a first node of a plurality of nodes defining a mesh network; receiving, by the processor, sensor data from a second roadside node of the plurality of nodes; generating, by the processor, vehicle instruction data for the first vehicle by applying one or more layers of a machine learning algorithm to the sensor data and the vehicle data associated with the first vehicle to; and transmitting, by the processor, the vehicle instruction data for the first vehicle to one or more roadside nodes of the plurality of nodes, wherein the vehicle instruction data contains instructions to cause the one or more roadside nodes to forward the vehicle instruction data to the first vehicle.

In some implementations, the processor is configured to transmit the vehicle instruction data to the one or more nodes by transmitting the vehicle instruction data to a third node located geographically between the first node and the second node.

In some implementations, the processor transmits the vehicle instruction data to the one or more nodes by transmitting an indication of an obstacle that is detectable by sensors of the second node but not by any sensors of the first node.

In some implementations, the processor transmits the vehicle instruction data to the one or more nodes by transmitting the vehicle instruction data to a third node located geographically between the first node and the second node.

In some implementations, the method further includes receiving, by the processor, a first indication of a driver of a second vehicle from the first node; and receiving, by the processor, a second indication of the driver of the second vehicle from the second node.

In some implementations, the method further includes storing, by the processor, a driving pattern for a driver profile of the driver and a vehicle profile of the second vehicle in a database.

In some implementations, the method further includes generating, by the processor, the driving pattern by assigning a first time stamp and a first location to the driving pattern based on the first indication and a second time stamp and a second location to the driving pattern based on the second indication.

In some implementations, the processor is configured to receive data associated with the first vehicle by receiving vehicle-originated data from the first vehicle.

In some embodiments, a method for communicating road condition data. The method comprises receiving, by a computer, node sensor data from one or more roadside nodes and vehicle-originated data for one or more vehicles; determining, by the computer, a current vehicle location of a first vehicle based upon the vehicle-originated data and a node location of a first roadside node of the one or more roadside nodes in communication with the vehicle; determining, by the computer, a road condition at a second node of the one or more road-side nodes and a condition location of the road condition by applying one or more layers of a machine learning algorithm on the node sensor data and the vehicle-originated data; determining, by the computer, a predicted intersection between a predicted future location of the first vehicle and the roadway condition; generating, by the computer, a vehicle notification indicating the predicted intersection; and transmitting, by the computer, the vehicle instruction to the first vehicle via the second node.

In some implementations, the method includes determining, by the computer, a vehicle type of the first vehicle by applying a vehicle recognition engine of the machine-learning architecture on a set of vehicle attributes received in the node sensor data and the vehicle-originated data.

In some implementations, the method includes determining, by the computer, a license plate associated with the first vehicle based upon a license plate image of the node sensor data; and querying, by the computer, a database for a vehicle profile associated with the license plate.

In some implementations, the method includes determining, by the computer, a driver score for a driver of the first vehicle according to one or more attributes of the driver behavior.

In some implementations, the method includes identifying, by the computer, the driver as a hazard responsive to determining that the driver score satisfying a hazardous driver threshold.

In some implementations, the method includes determining, by the computer, an identity of the driver based upon an identity of the first vehicle and the one or more attributes of the driver behavior.

In some implementations, the method includes generating, by the computer, a roadway layout defining a digital representation of the roadway and a plurality of objects including the first vehicle associated with the roadway by applying a roadway layout engine on the node sensor data and the vehicle-originated data.

In some implementations, the roadway condition includes at least one of a hazardous driver of a second vehicle, an object obstruction, an environmental obstruction, and a traffic delay.

In some implementations, the method includes determining the predicted intersection includes determining, by the computer, the predicted future location of the first vehicle based up-on geographic information of the node sensor data, and one or more attributes of a driver of the first vehicle, including one or more driver patterns stored in a driver profile.

In some implementations, the method includes the vehicle notification includes a processor-executable instruction for a vehicle processor of an autonomous vehicle.

In some embodiments, a system for communicating road condition data. The system comprises a computer comprising a processor and non-transitory computer readable medium containing instructions executable by the processor that when executed by the processor the computer is configured to: receive node sensor data from one or more roadside nodes and vehicle-originated data for one or more vehicles; determine a current vehicle location of a first vehicle based upon the vehicle-originated data and a node location of a first roadside node of the one or more roadside nodes in communication with the vehicle; determine a road condition at a second node of the one or more road-side nodes and a condition location of the road condition by applying one or more layers of a machine learning algorithm on the node sensor data and the vehicle-originated data; determine a predicted intersection between a predicted future location of the first vehicle and the roadway condition; generate a vehicle notification indicating the predicted intersection; and transmit the vehicle instruction to the first vehicle via the second node.

In some implementations, the computer is further configured to determine a vehicle type of the first vehicle by applying a vehicle recognition engine of the machine-learning architecture on a set of vehicle attributes received in the node sensor data and the vehicle-originated data.

In some implementations, the computer is further configured to determine a license plate associated with the first vehicle based upon a license plate image of the node sensor data; and query a database for a vehicle profile associated with the license plate.

In some implementations, the computer is further configured to determine a driver score for a driver of the first vehicle according to one or more attributes of the driver behavior.

In some implementations, the computer is further configured to identify the driver as a hazard responsive to determining that the driver score satisfying a hazardous driver threshold.

In some implementations, the computer is further configured to determine an identity of the driver based upon an identity of the first vehicle and the one or more attributes of the driver behavior.

In some implementations, the computer is further configured to generate a roadway layout defining a digital representation of the roadway and a plurality of objects including the first vehicle associated with the roadway by applying a roadway layout engine on the node sensor data and the vehicle-originated data.

In some implementations, the roadway condition includes at least one of a hazardous driver of a second vehicle, an object obstruction, an environmental obstruction, and a traffic delay.

In some implementations, when determining the predicted intersection, the computer is further configured to determine the predicted future location of the first vehicle based up-on geographic information of the node sensor data, and one or more attributes of a driver of the first vehicle, including one or more driver patterns stored in a driver profile.

In some implementations, the vehicle notification includes a processor-executable instruction for a vehicle processor of an autonomous vehicle.

It is to be understood that both the foregoing general description and the following detailed description are exemplary and explanatory and are intended to provide further explanation of the invention as claimed.

BRIEF DESCRIPTION OF THE DRAWINGS

The accompanying drawings constitute a part of this specification and illustrate embodiments of the subject matter disclosed herein.

FIG. 3 illustrates a schematic of a roadside node that can be used for preemptive communication of road condition data, according to an embodiment.

FIG. 4 shows a flowchart of execution steps of a method of a server for collecting and analyzing data received from various data sources and preparing instruction information for one or more vehicles.

DETAILED DESCRIPTION

Figure 1A:
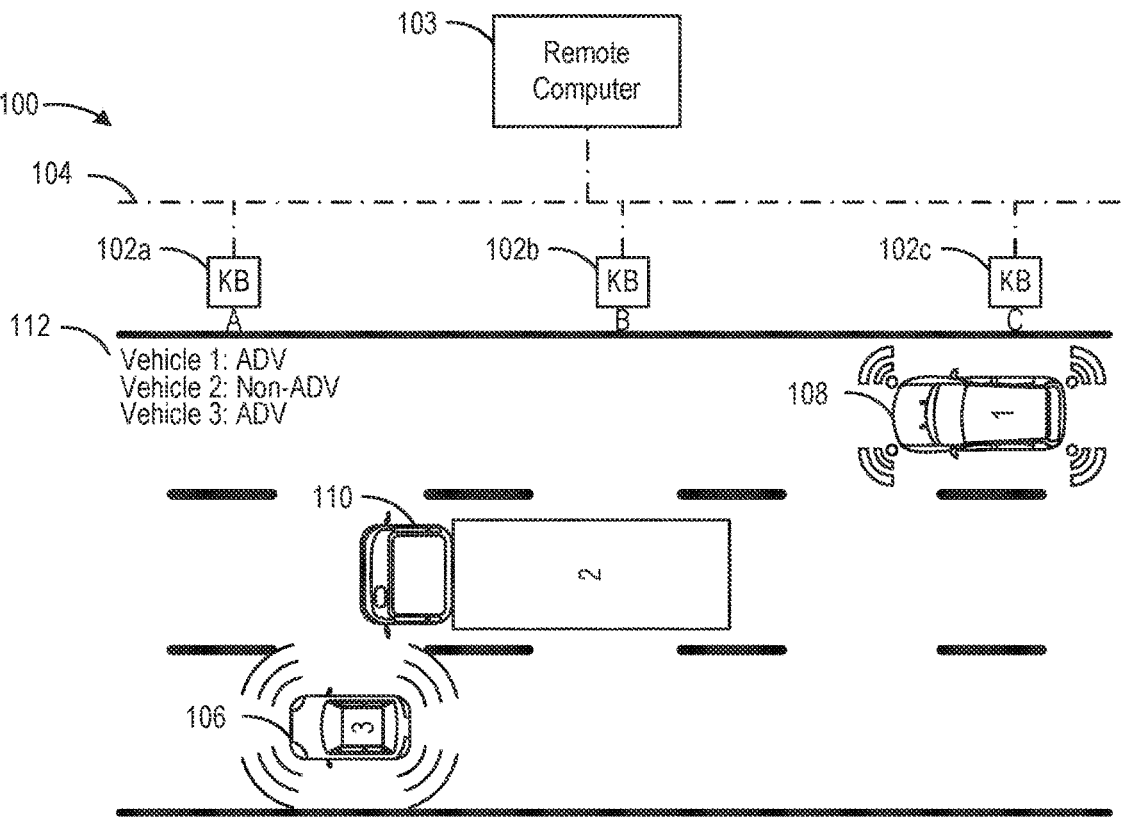
FIGS. 1A and 1B illustrate embodiments of an example network environment for preemptive communication of road condition data using one or more roadside nodes, according to an embodiment.

Reference will now be made to the illustrative embodiments illustrated in the drawings, and specific language will be used here to describe the same. It will nevertheless be understood that no limitation of the scope of the claims or this disclosure is thereby intended. Alterations and further modifications of the inventive features illustrated herein, and additional applications of the principles of the subject matter illustrated herein, which would occur to one ordinarily skilled in the relevant art and having possession of this disclosure, are to be considered within the scope of the subject matter disclosed herein. The present disclosure is here described in detail with reference to embodiments illustrated in the drawings, which form a part here. Other embodiments may be used and/or other changes may be made without departing from the spirit or scope of the present disclosure. The illustrative embodiments described in the detailed description are not meant to be limiting of the subject matter presented here.

As would be understood by persons of ordinary skill in the art, any number of the features described in any number of the embodiments below may be combined into a single embodiment, and the description of any features in separate embodiments is not intended to be limiting.

In general, as described in the below passages, a mesh network of roadside nodes may monitor the surrounding environment of a nearby road as well as signals that are transmitted from vehicles that are traveling along the road. Each roadside node may be a tower that is fastened into the ground and that includes a series of interchangeable housings or modules that are each dedicated to a different function in facilitating the autonomous travel of vehicles along the road. For instance, a roadside node may include a housing with cameras and/or LIDAR sensors that capture images of the surrounding environment, a housing that contains environmental sensors that detect data about the environment, and a housing for telecommunications equipment that facilitates communication to and from vehicles that are on the road as well as to a remote server for processing data. The roadside node may additionally include a housing that includes a processor that collects data from the components in the other housings and cleans and evaluates data. The processor may do so, for example, by identifying the license plate numbers of passing vehicles from pictures of vehicles. The processor may send any evaluated data as well as sensor data to the remote server for further processing. The remote server may receive the data and determine instructions or information to send vehicles on the road based on the received data. The remote server may send the instructions or information to the roadside node (or another roadside node of the mesh network) and the roadside node may forward the instructions to the vehicles on the road. By doing so, the remote server and mesh network of roadside nodes may operate in tandem to control or provide environmental information to vehicles on the road to decrease the chances that the vehicles crash and to otherwise improve the safety of the vehicles as they travel down the road.

In one example, the remote server may generate instructions that will cause a vehicle to avoid an unexpected object in the middle of the road. For instance, a roadside node may capture a picture of an animal crossing the road at an unexpected location (e.g., in the middle of the street without any markings for vehicles to stop or slow down). The roadside node may also receive a signal from a vehicle traveling on the road that indicates the vehicle is approaching the area that includes the animal. After receiving both sets of data, the roadside node may transmit the data to the remote server. The remote server may determine instructions to send the vehicle (e.g., send the vehicle via a roadside node nearest to the vehicle) that will cause the vehicle to slow down or navigate around the animal. Such instructions may be an identification of the animal and/or the location of the animal or operating commands that control the vehicle to swerve around the animal. Because the roadside node can have a higher vantage point as well as the ability to separately receive data from vehicles as they travel on the road and environmental data from a variety of different types of sensors (e.g., LIDAR sensors, temperature sensors, global positioning sensors, etc.), the roadside node may have better control of traveling vehicles than the vehicles themselves and/or provide vehicles with information the vehicles could not otherwise obtain.

Additionally, the mesh network of roadside nodes may operate together with a remote server to better optimize control of vehicles traveling on the road. For instance, continuing with the animal crossing the road example above, in some instances, a vehicle may be traveling too quickly to slow down and avoid a collision with the animal in the middle of the road using sensor data from a single roadside node. This may be a problem because roadside nodes may be stationary and have sensors with limited visibility (e.g., a vehicle may be traveling too quickly for a single roadside node to detect the vehicle's presence, detect the animal on the road, determine instructions to slow down or change the direction of the vehicle to avoid the animal, and transmit the instructions to the vehicle to avoid a collision). However, if one roadside node is located further down the road than another roadside node, the roadside node closest to the animal may detect the animal and the roadside node that is closest to the vehicle may detect the vehicle. The two roadside nodes may transmit the detected data to the remote server for processing and the remote server may generate an instruction to send to the vehicle through one of the roadside nodes to notify the vehicle of the animal and the position of the animal and/or to slow down or otherwise control the vehicle to avoid a collision. Because the roadside nodes are spaced apart, the cloud server may send the control instruction sooner and in time to slow down the vehicle to avoid the collision. In this way, the mesh network of roadside nodes may operate to control vehicles and improve vehicle safety as the vehicles travel on the road.

Figure 1B:
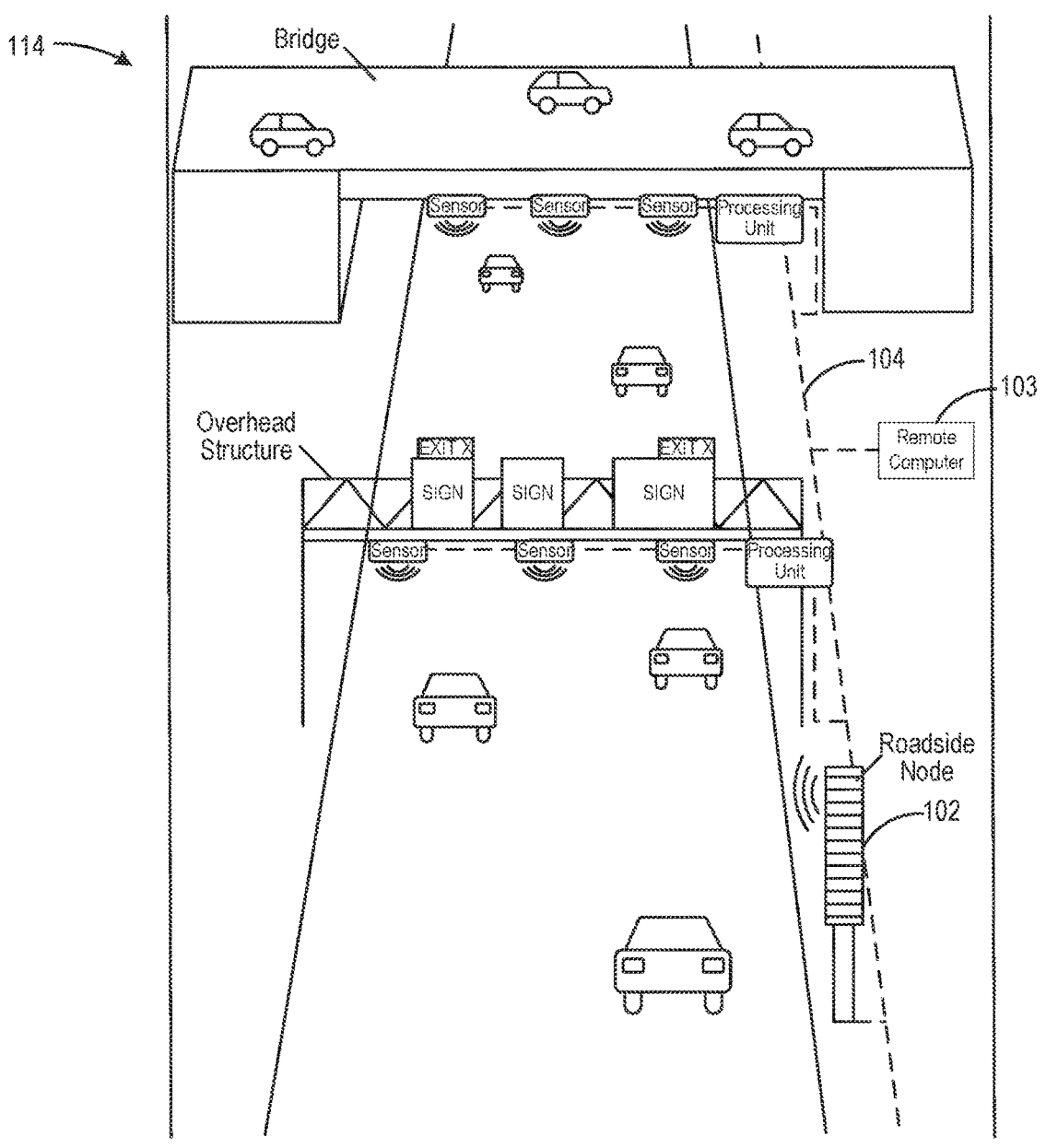

Embodiments herein describe systems and methods for preemptive communication of road condition data. FIGS. 1A and 1B illustrate embodiments of example network environments 100 and 114, respectively, which may be useful for practicing embodiments described herein, according to an embodiment. The network environments 100 and 114 may include roadside nodes 102a, 102b, and 102c (collectively referred to as, "roadside nodes 102") that are interconnected with each other and a remote computer 103 via a communications network 104 (e.g., fiber optic cabling traveling through one or more communication hubs). An example of a roadside node 102 is shown and described with reference to FIG. 3. The network environments 100 and 114 may be in a real-world location in which cars 106 and 108 are traveling along a road with a semi-truck 110. The roadside nodes 102 may be spaced apart (e.g., spaced apart at predetermined distances, such as 1000 feet) and be configured to collect environmental sensor data about the real-world location as well as signal data from any vehicles that are traveling on the road.

In operation, the roadside nodes 102 may actively scan the road for environmental sensor data and signal data from vehicles that travel on the road. The roadside nodes 102 may receive or detect such data (e.g., detect the position of each vehicle (including all the moving and stopped vehicles), road quality (e.g., potholes), surface conditions (e.g., rain, ice), temporary road closures, traffic re-routes, and any similar conditions on the roads) from sensors or the wireless interface circuits in the roadside nodes 102. The roadside nodes 102 may transmit the collected data to the roadside nodes of roadside nodes 102 and/or a remote computer 103 (e.g., a cloud server) to be analyzed. The roadside nodes 102 and/or the remote computer 103 may generate vehicle instruction data and transmit the vehicle instruction data to vehicles on the road to control the vehicles or to otherwise provide the vehicles with information about the roadway.

Together, the roadside nodes 102 may use an array of sensors, cameras, radar, LIDAR, or any similar sensors or equipment installed on the network environments 100 and 114. Through such equipment, the roadside nodes 102 may collect environment data (including traffic data) and other information about the road's condition. Additionally, the roadside nodes 102 may collect data from other sources, including data (e.g., speed, vehicle information, driver information, etc.) from vehicles on the road that sensors on the vehicles generate as the vehicles travel.

Using laser and image processing, the roadside nodes 102 or the remote computer 103 may locate vehicles, objects, pedestrians, etc., that are within the radii of the respective roadside nodes 102. In some cases, the roadside nodes 102 or the remote computer 103 may do so using sets of calculations such, as a machine learning algorithm (e.g., one or more layers of a machine learning algorithm, such as a neural network, a support vector machine, random forest, a clustering technique, etc.) or an artificial intelligence model, to estimate the real-time coordinates of the vehicles, objects, pedestrians on the roads. In the case of a physical obstruction in the line of sight of a sensor, any other reason that an object may be outside of a field-of-view of the sensor, or a sensor failure in a roadside node 102, the roadside nodes 102 or the remote computer 103 may use a machine learning model or an artificial intelligence algorithm to predict the location of the vehicles based on previously captured metrics by other roadside nodes 102 of the roadside nodes 102 (e.g., roadside nodes that the vehicles had previously passed that are connected to the roadside nodes 102 or any other data sources). For example, if a roadside node 102 has a malfunctioning sensor when the roadside node 102 detects a vehicle within a radius of the roadside node 102 (e.g., the vehicle requests data from the roadside node 102 or the roadside captures a picture of the vehicle), the roadside node 102 may request data from another roadside node of roadside nodes 102 about the vehicle to determine the vehicle's location. In this way, roadside nodes may avoid or address potential sensor blind spot issues that are caused by sensors not having a complete view of the environment.

In some cases, the roadside nodes 102 or the remote computer 103 may use unique identifiers to detect vehicles on the roadway. For example, a roadside node 102 may generate a unique identifier (e.g., a one-time permanent unique number or alphanumeric character) for a vehicle upon detecting the vehicle in autonomous mode for the first time. The roadside node 102 may generate the unique identifier using a pseudo-random number generator or a sequential nomenclature (e.g., the roadside nodes 102 may assign a first vehicle the number "1" and a second vehicle the number "2"). The roadside node 102 may then assign the unique identifier to the vehicle by transmitting the unique identifier to the vehicle and/or storing the unique identifier in a database containing identifiers for other vehicles. The vehicle may receive and similarly store the unique identifier in a local database. Accordingly, upon initiating a communication session with a roadside node 102 again, the vehicle may transmit the unique identifier to the roadside node 102. The roadside node 102 may receive the unique identifier and identify the vehicle by comparing the received unique identifier to the stored identifiers in the database the roadside node 102 maintains.

The roadside nodes 102 or the remote computer 103 may classify vehicles on the road using data about the vehicles. The roadside nodes 102 or the remote computer 103 may classify the vehicles into different vehicle types (e.g., cars, trucks, motorcycles, make, model, color, commercial, private, etc.). For instance, the roadside nodes 102 may collect data (e.g., shape, size, driving speed, driving pattern, etc.) about a vehicle driving on the road using sensor data the roadside nodes 102 collect. Based on the collected data, the roadside nodes 102 or the remote computer 103 may use artificial intelligence and machine learning algorithms to identify the vehicle type of the vehicle.

The roadside nodes 102 or the remote computer 103 may store data about detected vehicles in a database. For example, sensors on the roadside nodes 102 may actively detect and read vehicle license plates of vehicles on the road. Upon reading a license plate, a roadside node 102 may query a locally stored database to determine if the license plate has already been registered in the database (e.g., the license plate number on the license plate has already been stored in the database with a vehicle profile). If the roadside node 102 determines the license plate has already been registered, the roadside node 102 may fetch any sensor data or vehicle-originated data (e.g., data that the vehicle sends to the roadside node 102) the roadside node 102 collected about the vehicle and insert the data into a profile or entry in the database for the vehicle. However, if the roadside node 102 determines the license plate number on the plate is not in the database, the roadside node 102 may create a new profile in the database with the license plate number as an identification for the profile. Upon identifying a vehicle, a roadside node 102 may identify a time stamp of the data from which the data identifying the vehicle was collected and a location of the vehicle. The roadside node 102 may store the time stamp and location in the database (e.g., in the vehicle's profile) such that the roadside node 102 may later determine driving patterns of the vehicle as described herein. The roadside nodes 102 may store any received, detected, or generated data about the vehicle in the profile.

The roadside nodes 102 or the remote computer 103 may generate vehicle instruction data to send vehicles on the road. Vehicle instruction data may be data that causes a car or other vehicle to change how it is operating or that identifies a particular aspect of the condition of the road (e.g., an upcoming obstruction, an approaching reckless driver, an indication that a driver will take an exit based on the driver's driving pattern, etc.). In other words, the roadside nodes 102 or the remote computer 103 may generate and transmit vehicle instruction data to vehicles to autonomously control how the vehicles drive without human intervention.

In some cases, vehicle instruction data may be or include data packets in an Internet-of-Things application protocol (e.g., MQTT, AMQP, DDS, XMPP, CoAP, etc.). The vehicle instruction data may include commands that can be processed by a processor (or processors) on the vehicles and cause the vehicles to change how they operate. For instance, the vehicle instruction data may include a message with a command to change speeds (e.g., increase speeds or decrease speeds), turn left or right, honk a horn, drive in a figure-eight pattern, etc. In some cases, the message may also include a time or distance for the vehicle to execute the command (e.g., turn left after five minutes or turn left after traveling 100 feet). The vehicle instruction data may include any type of control data that can be used to provide information to a human driver or an autonomous vehicle or to provide instructions to control such an autonomous vehicle. In cases in which the vehicle instruction data just includes static data about the status of the road, the vehicle that receives the vehicle instruction data may identify the static data and autonomously operate according to the static data (e.g., swerve to avoid an upcoming obstacle or slow down to avoid a reckless driver).

The roadside nodes 102 or the remote computer 103 may generate the vehicle instruction data via a processor using machine learning and/or artificial intelligence techniques. For instance, a roadside node 102 or the remote computer 103 may detect data via one or more sensors and/or receive data from the car 108 and/or one or more of the other roadside nodes 102. A processor of the roadside node 102 and/or the remote computer 103 may execute a machine learning algorithm on the data to output vehicle instruction data (e.g., one or more commands) that can be used to control the car 108 as described in more detail below. In some cases, one roadside node 102 may process a portion of the data to generate a first portion of vehicle instruction data (e.g., a first command) and the remote computer 103 may process another portion of the data to generate a second portion of vehicle instruction data (e.g., a second command). In other cases, one roadside node 102 or the remote computer 103 may perform all of the processing described herein.

The roadside nodes 102 or the remote computer 103 may determine which vehicles are autonomous vehicles that are configured to receive vehicle instruction data from the roadside nodes 102. For instance, the roadside nodes 102 may detect vehicles on the road using sensors on the roadside nodes 102. However, only a subset of the detected vehicles may be autonomous vehicles that may receive vehicle instruction data from the roadside nodes 102. The roadside nodes 102 may determine which vehicles are autonomous and can receive vehicle instruction data by determining whether the vehicles have requested data from one of the roadside nodes 102 (e.g., determine whether the vehicles have requested data from one of the roadside nodes 102 via an application programming interface dedicated to communicating with the roadside nodes 102). Upon receiving a request from a vehicle, one of the roadside nodes 102 or the remote computer 103 may store an indication in the profile for the vehicle that indicates the vehicle can receive commands or other data from the roadside nodes 102. Accordingly, when a roadside node 102 detects the vehicle at a later time, the roadside node 102 may determine the vehicle can receive vehicle instruction data based on the indication in the vehicle's profile. Thus, the roadside node 102 may generate and transmit vehicle instruction data to the vehicle without receiving any subsequent requests from the vehicle. An example of identifiers in a database that indicate whether vehicles are autonomous and configured to receive data from the roadside nodes 102 is represented in FIG. 1A as autonomous vehicle identifiers 112.

In addition or alternatively to detecting autonomous vehicles, the roadside nodes 102 and/or the remote computer 103 may detect multiple types of non-autonomous vehicles. One type of non-autonomous vehicle may be or include a vehicle that is not equipped with any sensory package and physically is not capable of operating autonomously. Another type of a non-autonomous vehicle may be a vehicle that has the capability to operate autonomously but that is not configured to communicate with the roadside nodes 102. The roadside nodes 102 and/or the remote computer 103 may detect a vehicle is not equipped to operate autonomously by transmitting a signal to the vehicle and determining a defined time has elapsed without receiving a response. The roadside nodes 102 and/or the remote computer 103 may determine a vehicle is capable but not configured to communicate with the roadside nodes 102 by detecting an address or signal of a computer operating on the vehicle but not receiving a response to a communication session request from the computer and/or not receiving a request from the vehicle itself.

The roadside nodes 102 or the remote computer 103 may store communication category identifiers in profiles of different vehicles. The communication category indicators may be indications (e.g., binary indications) of whether vehicles that are configured to communicate with the roadside nodes 102 are also configured to (e.g., have the necessary permissions to) share data (e.g., sensor data, traffic data, etc.) with the roadside nodes 102. In some cases, vehicles may not be configured to (e.g., restricted from) share data collected or generated by a vehicle to protect the privacy of the vehicle's occupants. By storing indications of whether individual vehicles can share data with the roadside nodes 102, the roadside nodes 102 may use the identifiers in the database to determine whether to query vehicles for data or not. For instance, upon identifying a vehicle, a roadside node 102 may determine whether to request data from the vehicle based on whether the communication category identifier in the vehicle's profile indicates the vehicle is configured to share such data. In some cases, the roadside nodes 102 may store similar identifiers for driver profiles such that drivers can control whether their driving data can be shared. Thus, the roadside nodes 102 may avoid using processing resources to generate and transmit requests for data from vehicles that are not configured to, or are otherwise restricted from, providing such data.

While receiving data from other data source providers can be beneficial for the roadside nodes 102 or the remote computer 103 to provide more accurate predictions or more predictions, receiving such data is not necessary for the functionality of the system. The roadside nodes 102 and the remote computer 103 may each operate to provide vehicle instruction data to autonomous vehicles based solely on data that sensors of the roadside nodes 102 collect. However, if the roadside nodes 102 or the remote computer 103 do receive data from other data source providers, such as vehicles that are configured to collect and share such data, the road side nodes 102 and the remote computer 103 may have more data collected from sensors at different locations to have a better view of the roadside environment, and therefore more information to make predictions.

In some cases, the roadside nodes 102 or the remote computer 103 may generate and store driver profiles for drivers. The driver profiles may store any amount of information about drivers such as, but not limited to, driver demographic information, drive speed characteristics (e.g., average speed, top speed, average speed in relation to the speed limit, top speed in relation to the speed limit, etc.) and any other information received by roadside nodes 102. The driver profiles may also include information the roadside nodes 102 or the remote computer 103 generated and output by machine learning and/or artificial intelligence software executed by the roadside nodes 102 or the remote computer 103 (e.g., driving characteristics, habits, driving patterns, etc.). The roadside nodes 102 or the remote computer 103 may assign such driver profiles to vehicle profiles of the vehicles the respective drivers are driving.

The roadside nodes 102 or the remote computer 103 may assign multiple driver profiles to a single vehicle profile. For example, a vehicle may be driven by multiple drivers (e.g., a husband and wife may share a family vehicle). The remote computer 103 may execute one or more layers of an artificial intelligence or machine learning algorithm to identify different drivers of the same vehicle. In doing so, the remote computer 103 may identify the driving patterns, habits, and characteristics of the different drivers. For instance, the roadside nodes 102 or the remote computer 103 may maintain a travel history (e.g., driving time of the day, different days of the week, different weeks of the year, etc.) of a vehicle over a time period as the vehicle travels on a roadway. The roadside nodes 102 or the remote computer 103 may execute an artificial intelligence or machine learning algorithm using the travel history as input to identify different driving patterns, habits, and/or characteristics within the data. The remote computer 103 may determine the different driving patterns, habits, and/or characteristics are associated with different drivers. The roadside nodes 102 or the remote computer 103 may generate driver profiles for each of the drivers and store indications of the driver profiles in the vehicle profile to indicate the multiple drivers of the vehicle. Once the remote computer 103 generates profiles for the vehicles and the drivers of the respective vehicles, the remote computer 103 may generate, using machine learning and/or artificial intelligence techniques, and assign unique driver scores to the drivers' driver profiles for one or more defined time frames.

The remote computer 103 may update the driver profiles over time. To do so, the remote computer 103 may execute one or more layers of an artificial intelligence and/or machine learning algorithm using live data (e.g., data received by sensors about how the drivers are currently driving) and/or historical data from the driver profiles as input. For example, a driver profile may indicate a driver is an erratic driver and store the data the remote computer 103 used to determine the driver is an erratic driver in the profile. The remote computer 103 may continuously receive data about how the driver drives over time. The remote computer 103 may execute one or more artificial intelligence and/or machine learning algorithms using the data stored in the profile and the subsequently received data as input to determine a new driver classification of the driver. In doing so, the remote computer 103 may determine the driver is no longer an erratic driver and update the driver's profile to indicate the driver is not an erratic driver (e.g., remove an erratic driver indicator from the driver's profile).

The roadside nodes 102 or the remote computer 103 may use the driver profiles that are stored in a database to predict the route that the driver is currently taking. For example, the remote computer 103 may receive location data indicating the location of a vehicle. The remote computer 103 may identify the vehicle profile of the vehicle based on the license plate number of the vehicle and/or the driver profile of the driver driving the vehicle as described above. The remote computer 103 may identify the location and the current time (e.g., identify the time from an internal clock) and use artificial intelligence or machine learning algorithms to predict the route of the driver. In one example, Vehicle X, when driven by Driver A, may periodically get on highway I-95, from Exit 16, at 8:00 AM, and travels to Exit 14. At the end of the day, at 5:00 PM, Vehicle X may take Exit 14 to I-95, and then take Exit 16 to exit highway I-95. This may be a pattern of Vehicle X, driven by Driver A on weekdays. The remote computer 103 may identify the pattern after collecting data about the vehicle from various roadside nodes 102 indicating the vehicle follows the pattern for successive weekdays or for a number of times exceeding a threshold. Upon identifying the pattern, the remote computer 103 may store an indication of the pattern such that at a later time the remote computer 103 may transmit vehicle instruction data to the vehicle to cause the vehicle to follow the pattern. The remote computer 103 may do so upon receiving a detection indication of the vehicle from a roadside node 102.

The remote computer 103 may store unique roadside node identifiers for each of the roadside nodes 102. For example, upon a roadside node 102 being installed (e.g., installed in the ground), the remote computer 103 may receive an indication from the roadside node 102 indicating the roadside node 102 has been installed. The indication may include a unique identifier of the new roadside node 102 or the remote computer 103 may generate a unique identifier (e.g., using a random number generator or a rule-based nomenclature system) for the new roadside node 102. The remote computer 103 may receive or generate the unique identifier for the roadside node 102 and the remote computer 103 may insert the unique identifier into a database with location information (e.g., geographic location data) indicating the location of the roadside node 102. In this way, the remote computer 103 may create profiles for roadside nodes 102.

The remote computer 103 may update the profiles for the roadside nodes 102 with live data about the area surrounding the roadside nodes 102. For example, the remote computer 103 may receive information about the area surrounding a roadside node 102 such as, but not limited to, road width, number of lanes, distance from any intersection and exit, distance from rest areas, gas and charging stations, points of interest, and other similar information. The remote computer 103 may receive such information via a user input. Upon receiving the information, the remote computer 103 may identify the identifier of the roadside node 102 for which data was input and insert the received information into the stored profile that includes the identifier.

In addition to storing user input information into memory for roadside nodes 102, the remote computer 103 may also store data that is generated by sensors of the roadside nodes 102. For example, a roadside node 102 may store sensors that scan the road and environment conditions for any potential changes in the road environment. Examples of data the sensors may collect include road surface and changing conditions (e.g., pothole, wet, snowy, icy, defrost solutions, visibility, daylight, etc.). The sensors may also detect objects such as stopped vehicles, pedestrians, animals (e.g., alive or dead animals, uneven surface or damaged road surface, road or lane closure such as closures caused by active construction, school buses, or emergency vehicles, etc.). As the sensors on the roadside node 102 detect such data, the roadside node 102 may transmit the data to the remote computer 103 and the remote computer 103 may update the profile for the roadside node 102 accordingly. By storing and updating the different types of data in the database, the remote computer 103 may have access to data to use in conjunction with vehicle-originated data to generate vehicle instruction data (e.g., the remote computer 103 may retrieve data from the roadside node profile upon receiving location of a vehicle within or approaching the area surrounding the roadside node 102).

The remote computer 103 may use sensor data that is collected at one or more of the roadside nodes to actively scan and detect dangerous situations on the roads. To do so, the remote computer 103 may receive sensor data (e.g., videos or images) of vehicles traveling on the road from one or more roadside nodes 102. The remote computer 103 may execute one or more layers of a machine learning algorithm or artificial intelligence model and use the sensor data as input to detect ongoing reckless driving, such as drunk driving. Additionally, in some cases, the remote computer 103 may use the machine learning algorithms and/or artificial intelligence model to predict potential reckless driving situations. For example, by processing a video of a driver cutting off another driver, the remote computer 103 may detect a possible road rage incident that could cause the cut-off driver to drive recklessly. When predicting or detecting a reckless driver on the road, the remote computer 103 may generate a flag in the database indicating there is a hazard on the road and/or generate vehicle instruction data to transmit to control the vehicles to avoid the reckless driver. In some cases, the remote computer 103 may notify vehicles about the reckless driver and the vehicles may operate based on the notification. In this way, the remote computer 103 may improve the safety of vehicles on the road and avoid potential accidents.

In another example, the remote computer 103 may execute the machine learning algorithm and/or artificial intelligence model using sensor data from one or more roadside nodes 102 to detect on-duty public safety vehicles (e.g., a firefighter truck with the siren on). Upon doing so, the remote computer 103 may generate vehicle instruction data indicating for vehicles to yield to the on-duty public safety vehicles and transmit the vehicle instruction data to the vehicles that may encounter the public safety vehicles. For instance, the remote computer 103 may detect the location of an on-duty public safety vehicle either based on GPS data that indicates the public safety vehicle's location or based on the stored location of the roadside node 102 that transmitted data identifying the on-duty public safety vehicle. The remote computer 103 may identify vehicles that are within a predetermined radius of the on-duty public safety vehicle based on GPS data or roadside node location data of roadside nodes 102 that are within a radius of the on-duty public safety vehicle. The remote computer 103 may generate vehicle instruction data that causes vehicles to avoid the on-duty public safety vehicle (or otherwise notifies the vehicles about the on-duty public safety vehicle) and transmit the vehicle instruction data to vehicles the remote computer 103 identifies as being within a predetermined distance of the on-duty public safety vehicle. Thus, the remote computer 103 may help vehicles on the road avoid collision with an on-duty public safety vehicle. In another example, the remote computer 103 may similarly detect on-duty school buses and generate and transmit vehicle instruction data to vehicles within a predetermined radius of the on-duty school buses to cause the vehicles to take appropriate action based on local laws (e.g., stop and avoid passing the school bus when the bus is stopped).

Figure 2:
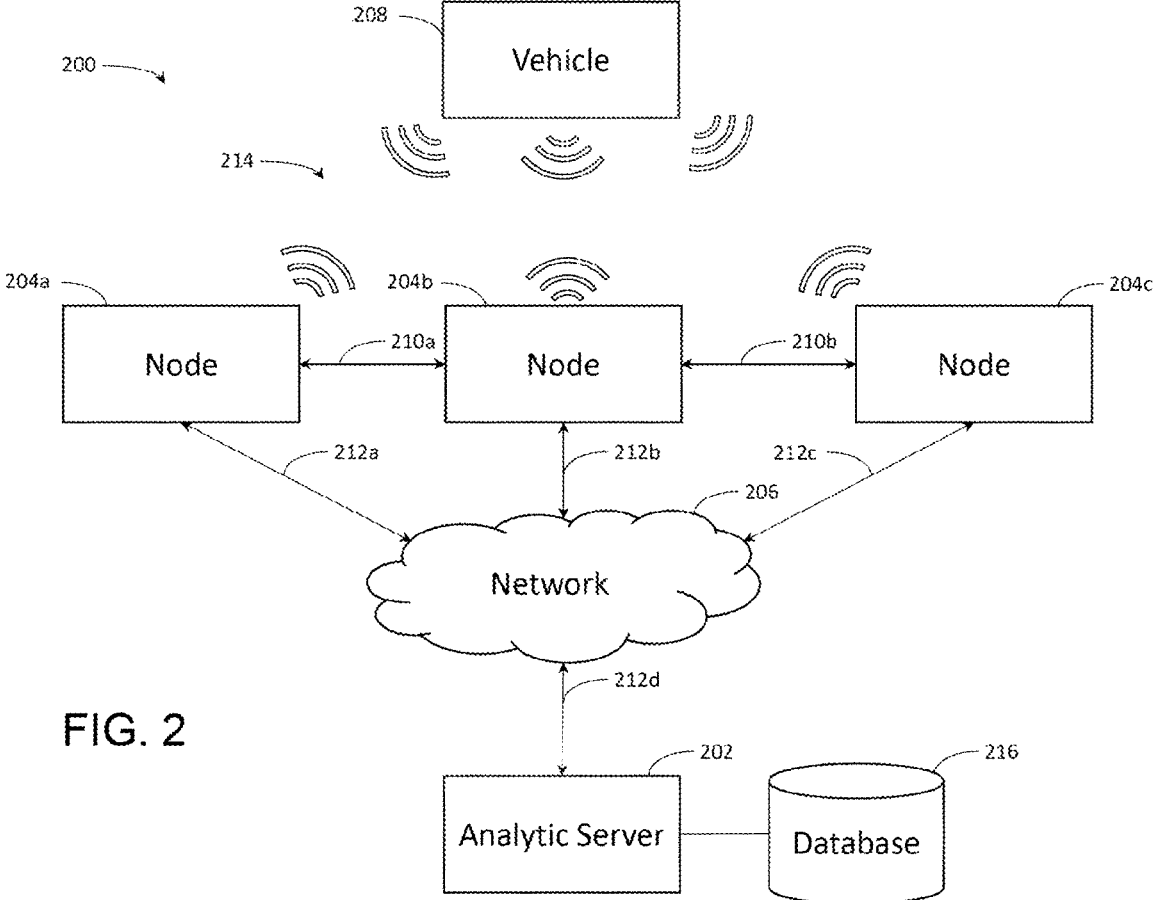
FIG. 2 illustrates a block diagram of an example network environment for preemptive communication of road condition data using one or more roadside nodes, according to an embodiment.

FIG. 2 illustrates a block diagram of a network environment 200 for preemptive communication of road condition data, according to an embodiment. The network environment 200 may include an analytic server 202. The network environment 200 may include roadside nodes 204*a*, 204*b*, and 204*c* (collectively referred to as, "roadside nodes 204") that are interconnected with analytic server 202 via a network 206. The roadside nodes 204 may be the same as or similar to the roadside nodes 102. The network environment 200 may additionally include a vehicle 208, such as a car that is traveling down a road. Roadside nodes 204 may communicate with the vehicle 208 via a two-way wireless communication protocol to receive information about the vehicle 208 and how the vehicle 208 is operating. Roadside nodes 204 may also use the two-way wireless communication protocol to transmit vehicle instruction data to the vehicle 208. Although FIG. 2 shows only a select number of computing devices or components (e.g., analytic server 202, roadside nodes 204, network 206, vehicle 208, etc.), network environment 200 may include any number of components (in any combination) that are interconnected in any arrangement to facilitate the exchange of data between the computing devices and components.

The network environment 200 may provide the connectivity needed for multiple roadside nodes 204 to communicate with each other, the analytic server 202, and vehicles on the roadway to enable autonomous travel. In doing so, the network environment 200 may include fiber optic, utility network, and renewable energy farms such as solar/wind power farms within the major US highway right-of-way. The network environment 200 may also use the capacity to deliver other services, such as broadband connectivity and renewable energy.

The analytic server 202 may function as an interface for an administrator to set configuration settings or provide operational instructions to various components of the network environment 200. The analytic server 202 may be any computing device comprising a communications component capable of wired or wireless communication with other components of the network environment 200, and a processor configured to transmit and receive certain types of data from the components of the network environment 200.

Non-limiting examples of the analytic server 202 may include a server (e.g., an application server, a catalog server, a communications server, a cloud server, a computing server, a database server, a file server, a game server, a mail server, a media server, a proxy server, a virtual server, a web server, etc.) a personal computer, a laptop computer, a desktop computer, a mobile computer, a tablet computer, a smart phone, a digital video recorder, a set-top box for a television, a video game console, a digital wallet (sometimes referred to as an "e-Wallet"), or any other type and form of computing device or combinations of devices. In some embodiments, the type of analytic server 202 may be categorized as a mobile device, a desktop device, a device intended to remain stationary, a device adapted to primarily access a network via a local area network (e.g., network 206), or another category of electronic devices such as a media consumption device. The analytic server 202 may include a user application (e.g., a web browser, an email application, an FTP application, etc.) to facilitate the sending and receiving of data over network 206.

For ease of explanation, FIG. 2 shows a single computer device functioning as the analytic server 202. However, it should be appreciated that some embodiments may comprise any number of computing devices functioning as the analytic server 202 and capable of performing the various tasks described herein The analytic server 202 may be configured to receive sensor data (e.g., environmental sensor data, GPS data, images, videos, LIDAR data, etc.) or vehicle-originated data detected by one or more roadside nodes 204 through network 206. The analytic server 202 may use such data to generate vehicle instruction data or portions of vehicle instruction data. For example, the analytic server 202 may receive location data indicating the geographic location of the vehicle 208 from one of the roadside nodes 204. The analytic server 202 may also receive sensor data indicating a road condition (e.g., a pothole in the road) from another of the roadside nodes 204. In response to receiving such data, the analytic server 202 may generate instructions to transmit to the vehicle 208 to either alert the vehicle of the road condition or control the vehicle 208 to avoid the road condition.

Vehicle 208 may be any motorized conveyance capable of traveling and performing various tasks and processes described herein. Non-limiting examples of the vehicle 208 may include a car, a motorcycle, a truck, a semi-truck, a boat, a helicopter, an airplane, or any other vehicle that is designed to transport passengers. For ease of explanation, FIG. 2 shows only one vehicle in communication with roadside nodes 204. However, it should be appreciated that some embodiments may comprise any number of vehicles that are traveling and in communication with roadside nodes 204 and are capable of performing the various tasks described herein.

The vehicle 208 may be a vehicle that functions as a sensor device to provide the roadside nodes 204 with data. For example, the vehicle may detect data about the environment such as temperature data or other weather data, data about the current speed of the vehicle, data about the current driver of the vehicle (which the vehicle may determine from the profile of the driver), or any other type of data to the roadside nodes as the vehicle 208 passes the roadside nodes 204 and the roadside nodes 204 request such data. In some cases, the vehicle 208 may further include a sensor processor configured to process the detected data and extract identification information from the detected data. Non-limiting examples of the sensor technologies for the sensor devices may include resonant LC sensors, capacitive sensors, and inductive sensors. Based upon the particular type of sensor waves used and the particular protocols associated with the sensor waves, the sensor devices may observe information about the environment and then generate sensor data, which may include information associated with the observed information. The sensor processor may receive, interpret, and process the sensor data. The sensor processor may then transmit the sensor data to the roadside nodes 204 to forward to the analytic server 202 for further processing.

Examples of a network 206 may include, but are not limited to, private or public LAN, WLAN, MAN, WAN, and Internet. The network 206 may include both wired and wireless communications channels according to one or more standards and/or via one or more transport mediums. The communication over the network 206 between the components of the network environment 200 may be performed in accordance with various communication protocols such as Transmission Control Protocol and Internet Protocol (TCP/IP), User Datagram Protocol (UDP), and IEEE communication protocols. In one example, the network may include wireless communications according to Bluetooth specification sets, or another standard or proprietary wireless communication protocol. In another example, the network may also include communications over a cellular network, including, e.g., a GSM (Global System for Mobile Communications), CDMA (Code Division Multiple Access), and EDGE (Enhanced Data for Global Evolution) network.

The vehicle 208 may be directly or indirectly connected to the analytic server 202 and/or the roadside nodes 204 via the network 206. Accordingly, the vehicle 208 may be capable of wired or wireless communication through a variety of communication channels with the analytic server 202 and/or the roadside nodes 204 over the network 206. During the wired or wireless communication between the analytic server 202, the roadside nodes 204, and the vehicle 208, the vehicle 208 may travel into and out of the communication radius of different roadside nodes 204. When doing so, the communication interface on the vehicle 208 may establish connections (e.g., using a handshaking protocol) with the roadside nodes 204 with which the vehicle 208 is in range and disconnect from the roadside nodes when the vehicle 208 leaves the range. When transmitting data between each other, the analytic server 202, the roadside nodes 204, and/or the vehicle 208 may normalize and format the data in accordance to pre-stored instructions prior to transmitting the data to the destination. In some cases, any of the analytic server 202, the roadside nodes 204, or the vehicle 208 may store a local copy of the data in their memory prior to transmitting an original copy of the data to the destination.

In one example, the vehicle 208 may request data from roadside nodes 204 that the vehicle 208 is approaching but has not yet established a connection. For example, the vehicle 208 may be driving on a road having roadside nodes A, B, C, D, and E. The vehicle 208 may store unique identifiers for each of the roadside nodes A, B, C, D, and E. Upon establishing a connection first with roadside nodes A and B, the vehicle 208 may determine to request environmental data from the roadside nodes C, D, and E by identifying a pattern of roadside nodes from memory. The vehicle may then send a request to roadside node A or roadside node B for environmental data from roadside nodes C, D, and/or E. The roadside node that received the request may transmit a request to roadside nodes C, D, and/or E for environmental data according to the request and forward any received environmental data to the vehicle 208. This may be useful, for example, if the vehicle 208 seeks to learn the current traffic situation according to the normal traveling pattern of the vehicle 208 to potentially reroute to travel using a different route. In this way, the vehicle 208 may use the mesh network of roadside nodes 204 to retrieve data about previously unavailable road environment data.

Network components may effectuate wired and/or wireless signal communications to and from various devices. For example, the roadside nodes 204 may be connected with each other through fiber optic cabling 210a, 210b and/or other communication methods. The roadside nodes 204 may be connected with the analytic server 202 through the network 206 via fiber optic cabling 212a, 212b, 212c, and 212d and/or other communication methods. The roadside nodes 204 may have wireless interface circuits that are configured to transmit vehicle instruction data generated by the individual roadside nodes 204 and/or the analytic server 202 via wireless signals 214. The wireless interface circuits may include network components such as transmitters, Wi-Fi routers, Bluetooth low energy (BLE) transmitters, etc. These network components may be a part of the wireless interface circuits and may be connected to processors of the roadside nodes 204. The network components may include electromechanical components (e.g., processor, antenna) that allow the network components to communicate various types of signal data with one or more electronic devices (e.g., vehicles on the road). In some implementations, these signals may represent a distinct channel for hosting communications. The data may be communicated using signals, based on predetermined wired or wireless protocols and associated hardware and software technology. The network components may operate based on any number of communication protocols, such as Bluetooth®, Wireless Fidelity (Wi-Fi), and others.

Database 216 may be directly or indirectly connected to the roadside nodes 204 and the analytic server 202. Accordingly, the database 216 may be capable of wired or wireless communication through a variety of communication channels with the roadside nodes 204 and the analytic server 202 over the network 206. During the wired or wireless communication between the analytic server 202, the roadside nodes 204, and the database 216, the database 216 is capable of receiving data from the analytic server 202 and the roadside nodes 204. The database 216 may include vehicle profiles including vehicle data (e.g., vehicle characteristics and driving patterns) for different vehicles and driver profiles including driver data; non-limiting examples of the driver data includes driver demographics or personality information (e.g., associated vehicles, associated license plates, driver images, facial recognition models, driver's license number), and driver operating or behavioral characteristics such as driving style (e.g., speed, following distance, turn radius, etc.), driving patterns (e.g., routes, times, destinations, roads, days of the week), and other similar data. Additionally, the data may include, but may not be limited to, all received location data and environmental data, approximate longitude and/or latitude coordinates of where roadside nodes 204 that detect environmental data, timestamps indicating the times at which the environmental or location data was generated by one of the roadside nodes 204, identification information of the roadside nodes 204 that provided the individual data points, identification information of the vehicles that provided or that are otherwise associated with the individual data points (e.g., vehicle information identifying a particular car as driving recklessly at a specific time), among other data and identification information. For ease of explanation, FIG. 2 shows a single database 216 connected to the analytic server 202. However, it should be appreciated that some embodiments may comprise any number of databases capable of performing the various tasks described herein and/or that are connected or accessible to the roadside nodes 204 either individually or together.

The database 216 may have a logical construct of data files that are stored in non-transitory machine-readable storage media, such as a hard disk or memory, controlled by software modules of a database program (for example, SQL), and a related database management system (DBMS) that executes the code modules (for example, SQL scripts) for various data queries and other management functions generated by the analytic server 202 and the roadside nodes 204. In some embodiments, a memory of the databases 216 may be a non-volatile storage device. The memory may be implemented with a magnetic disk drive, an optical disk drive, a solid-state device, or an attachment to a network storage. The memory may include one or more memory devices to facilitate storage and manipulation of program code, set of instructions, tasks, data, PDKs, and the like. Non-limiting examples of memory implementations may include, but are not limited to, a random access memory (RAM), a read only memory (ROM), a hard disk drive (HDD), a secure digital (SD) card, a magneto-resistive read/write memory, an optical read/write memory, a cache memory, or a magnetic read/write memory. In some embodiments, a memory of the databases 216 may be a temporary memory, meaning that a primary purpose of the memory is not long-term storage. Examples of the volatile memories may include dynamic random access memories (DRAM), static random access memories (SRAM), and other forms of volatile memories known in the art. In some embodiments, the memory may be configured to store larger amounts of information than volatile memory. The memory may further be configured for long-term storage of information. In some examples, the memory may include non-volatile storage elements. Examples of such non-volatile storage elements include magnetic hard discs, optical discs, floppy discs, flash memories, or forms of electrically programmable memories (EPROM) or electrically erasable and programmable (EE-PROM) memories.

FIG. 3 illustrates a schematic of a roadside node 300 that can be used for preemptive communication of road condition data, according to an embodiment. The roadside node 300 may be one or more of the roadside nodes 102 or 204. The roadside node 300 may be or include a structure designed to be installed within the roadway and highways. The roadside node 300 may be developed and manufactured using a design selected according to the geographical location in which the roadside node 300 is designated to be installed. The roadside node 300 includes a housing defining structure that encloses electronic components of the roadside node 300. The housing of the roadside node 300 includes any number of shelving units 302a-326a that define a space on or into which housings of the modules 302-326 may be installed and couple to the roadside node 300. The housing of the roadside node 300 is configured to hold any number of module housings of modules 302-326, inserted into or placed on a corresponding shelving unit 302a-326a. The modules 302-326 include the hardware and software components of a particular module 302-326. Modules 302-326 further include module housings defining a structure that surrounds or encloses the hardware and software component of the corresponding module 302-326. The roadside node 300 may include one or more housings of one or more corresponding modules 302-326 that store equipment that is dedicated to a different function to facilitate the operation of vehicles on a roadway. The module housings and modules 302-326 may be removably and replaceably coupled to the shelving units 302a-326a to facilitate rip-and-replace approach to maintaining or upgrading the modules 302-326 of the roadside node 300. For example, a roadside node 300 may include a street lighting module 302 situated at the highest shelving unit 302a, a camera module 304, an environmental sensing module 306, an Internet-of-Things module 308, a telecommunication module 310, a public safety module 312, a processing module 314, a cloud module 316, a self-service module 318, a public safety module 320, an auxiliary backup battery module 322, a power distribution module 324, and/or a set of other modules 326. Each of the modules 302-326 may store equipment that is capable of performing a particular function to which the module is dedicated. The roadside node 300 may include any number of modules that may perform any function. The roadside node 300 may be a modular unit capable of being modified to accommodate various Internet-of-Things devices, including but not limited to environmental and weather sensors, surveillance and security cameras, etc.

To store or operate the modules 302-326, the roadside node 300 may include a foundation 328, a base (e.g., a mount) 330, an equipment module 332, and/or a solar panel 334. The foundation 228 may be or include pre-cast concrete designed and cast according to the size, function, and/or shape of the roadside node 300. The foundation 328 may additionally be designed based on the soil type, site condition, etc., of the area in which the roadside node 300 is being installed. The foundation 328 may be pre-fabricated to enable fast installation of the roadside node 300. Pre-fabricating the foundation 328 may reduce construction costs compared to pour-in-place foundations that can involve shutting down the roadway and splitting installation times between different hours or days in which construction work can be performed. The base 330 may connect the foundation 328 to the equipment module 332. The base 330 may be designed and manufactured to various heights to accommodate different sites. The equipment module 332 may be the main shelving box of the roadside node 300 with shelving units 302a-326a on or into which modules 302-326 or module housings for dedicated equipment can be placed. The shelving units 302a-326 include a physically coupling latch or fastener for detachably coupling the housings of the modules 302-326 to the structure of the tower, at the shelving unit 302a-326a. The shelving units 302a-326a may also include interfaces electrically coupling a power supply of the tower and a power interface of the housing, and interfaces communicatively coupling a data bus of the tower or communication interface of the shelving units 302a-326a to the module 302-326. The equipment module 332 may be configured to store the modules 302-326 such that the modules 302-326 may be easily repaired and replaced by removing the respective modules from the equipment module 332 and placing a new module in the initial module's place or by repairing the module (e.g., repairing the equipment in the module) itself and placing the module back on the shelf. As such, the housings of the modules 302-326 are removably coupled or interchangeably coupled to the shelving units 302a-326a. Additionally, the equipment module 332 may include extra shelves (or extra shelves can be added at a later time) to allow future modules to be added to the equipment module 332. The extra shelves may each be electrically coupled to the shelving units 302a-326a and may have fiber optic (or other network communication) connectivity to enable any equipment supported by the extra shelves to be powered and/or connected to the network.

The solar panel 334 may be directly connected to the power distribution module 324 and/or the equipment module 332 and may generate solar energy. The solar panel 334 may have a 360-degree rotation window with a 90-degree tilt window to increase the amount of solar energy the solar panel 334 can generate throughout a day (e.g., the solar panel may rotate and/or tilt to capture more sunlight as the sun moves across the sky or is covered by clouds). The equipment in the roadside node 300 may use power from the solar panel 334 and/or an energy grid to operate.

The roadside node 300 may be assembled using a modular design. For example, each component of the roadside node 300 may be fabricated at an off-site location. The different components may be transported to the designated installation site for the roadside node 300. Operators may first install the foundation 328 into the ground at the designated location within the installation site. The operators may next bolt the base 330 to the top of the foundation 328. The operators may bolt the equipment module 332 to the top of the base 330. The operators may similarly install other roadside nodes 300 and then connect the roadside nodes together into a communication network with fiber optic cables that run through one or more fiber optic hubs to the other roadside nodes.

The roadside node 300 may be powered by the auxiliary backup battery module 322 and the power distribution module 324. For instance, the solar panel 334 may generate energy and transmit the energy to the power distribution module 324 to distribute to the various modules 302-322 and 326. If the roadside node 300 receives any power from a utility grid, the power lines may be connected from the utility grid to the power distribution module 324 through handholes 336. The power may be fed through to all of the equipment of the roadside node 300 via the power lines. Additionally, the auxiliary back battery module 322 may include a backup battery installed to the base 330 that may be used in case of a power outage. The auxiliary back battery module 322 may be designed and mounted to the base 330 such that the auxiliary back battery module 322 can be swapped with minimal effort.

The equipment of roadside node 300 may be continuously fed by two separate fiber connectivity wires. The two wires may be fed through the handholes 336. The two wires may provide redundancy in case of a data outage in one of the fiber optic cables connecting the roadside node 300 to other roadside nodes and/or a remote computing device.

The equipment of the telecommunication module 310 may enable the roadside node 300 to communicate with other roadside nodes. For example, the roadside node may be a node of a mesh network (e.g., the roadside nodes 102 or 204) of roadsides nodes that can communicate with each other through the fiber optic cabling system described above. Together, the roadside nodes may form a private network that provides connectivity for vehicles and other equipment that can connect with each other on the roads. The telecommunication module 310 may operate as the communication pathway between the private network and vehicles (e.g., connected vehicles, non-connected vehicles, and any other devices on the road or that are otherwise near the roadside node 300). The roadside node 300 may be equipped with equipment in the telecommunication module 310 that can transmit captured data from different sensors and devices to the processing module 314, the core network through the fiber connectivity wires connected to a core network, and/or any other means of communication. The telecommunication module 310 may include different telecommunication radios such as LTE, 5G, CBRS, Bluetooth, WiFi, NFC, and any other means of data transmission and communication (e.g., any other telecommunication devices).

Additionally, in some cases, the telecommunication module 310 may communicate with nearby roadside nodes independent of the fiber backhaul connectivity using technologies such as microwave transmission, laser communication, and/or similar technologies. The telecommunication module 310 can also deliver satellite radio connectivity to nearby devices.

The roadside node 300 may be equipped with an array of sensors (including cameras, radar, laser, and similar) in the camera module 304 and/or the environmental sensing module 306. The array of sensors may capture and feed environment data (including traffic data) to help enable fully functional autonomous driving. For example, the sensors may actively scan and survey the surrounding road environment and traffic, enabling the roadside node 300 or a central server to identify a traffic congestion delay. Via the telecommunication module 310, the roadside node 300 may transmit data collected by the sensors to a remote server or processing unit in real-time. The remote server or processing unit may store, process, and analyze the data to generate vehicle instruction data containing commands to control the vehicle for which the data was generated or to otherwise generate indications of the environment to notify vehicles about upcoming road hazards. The remote server may transmit the vehicle instruction data back to the roadside node 300 to forward to the vehicle. Such real-time data transmission may be enabled by the fiber network that connects the roadside node 300 to other roadside nodes and the remote server. In this way, the roadside node 300 may supply data generated by autonomous driving algorithms to vehicles on the road.

The self-service module 318 may be a module that assists in maintaining the roadside node 300. For example, the self-service module 318 may include a self-cleaning unit, an animal detector, repellent, etc. The self-cleaning unit may liquefy and collect air moisture to clean a glass shield of the roadside node 300 that protects the roadside node 300 from the environment. The self-service module 318 may additionally include an automatic wiper to clean the shield regularly (e.g., at set intervals).

The public safety module 320 may include equipment that enables drivers on the road to have roadside assistance. For example, the public safety module 320 may include a cellular system that can connect drivers to emergency service providers such as the police, fireman, or tow trucks. A user can open the public safety module 320 to retrieve equipment from the public safety module to contact the user's desired personnel.

The lighting module 302 may be or include equipment that physically lights up the area surrounding the roadside node 300. For example, the lighting module 302 may be or include light bulbs (e.g., LED light bulbs) to illuminate the surrounding area and operate as street lights to enable drivers to see during the night. The lighting module 302 may provide lighting for a few different purposes. One purpose may be to illuminate the roadside module 300 itself so the roadside module 300 is identifiable to flying objects. Another purpose may be to provide lighting for roadside assistance and public safety users. In some cases, the lighting module 302 may be equipped with lighting and motion detection sensors to activate between dusk and dawn and as users or drivers approach the roadside node 300. The lighting module 302 may be placed on top of the other modules to provide adequate lighting to the surrounding area and to be more visible to flying objects.

In some cases, the roadside node 300 may be equipped with global positioning sensors or other similar technologies in one of the modules 302-326. The global positioning sensors may detect the geographic location of different vehicles and provide the location data to a processor for processing. The geographic location data may be particularly useful in a mesh network of roadside nodes as the roadside node 300 may detect the position of a vehicle and provide the location to other roadside nodes and/or the remote server for processing.

In some cases, the roadside node 300 may be equipped with active microphones and other sonar technologies. The microphones may enable a user to speak and listen to people in the area surrounding the roadside node 300.

Figure 5:
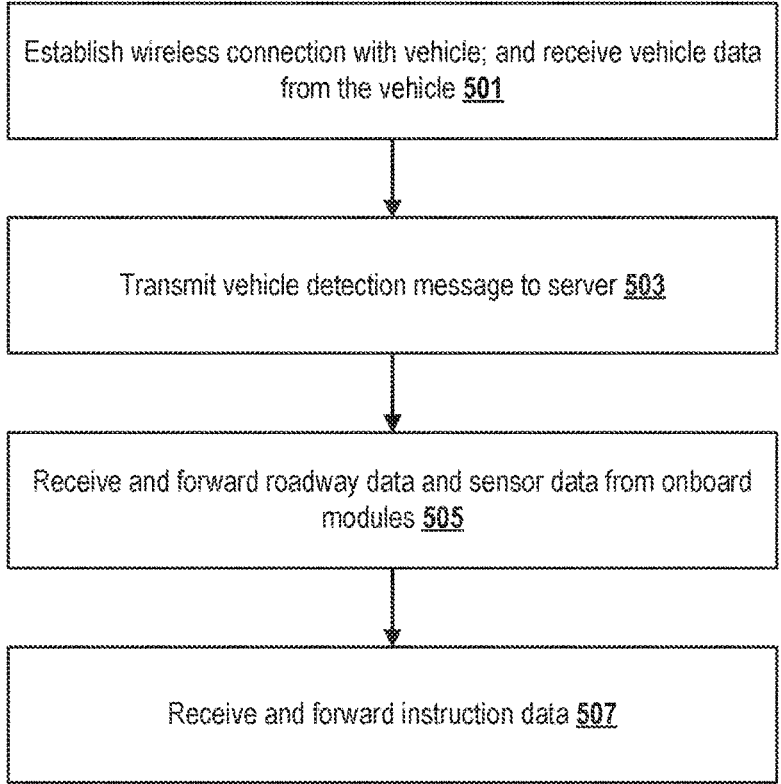
FIG. 5 shows a flowchart of execution steps of a method by roadside nodes for collecting and analyzing data received from various data sources and preparing instruction information for one or more vehicles.
Figure 6:
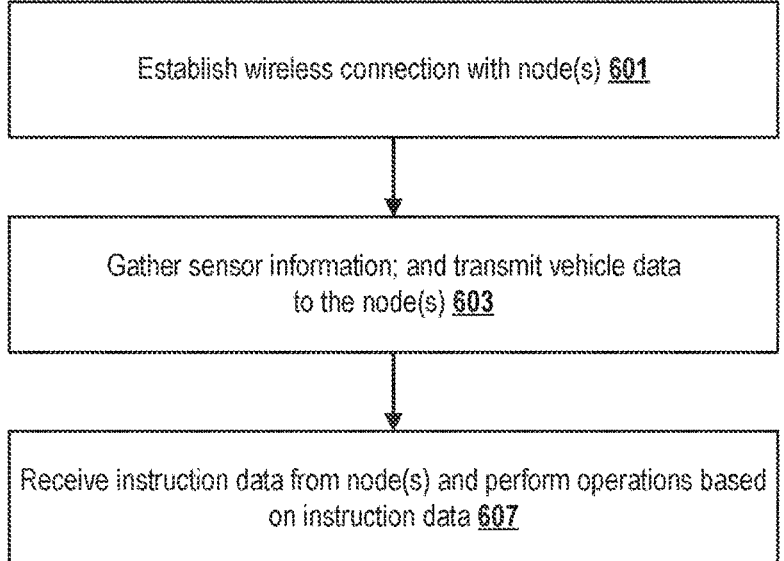
FIG. 6 shows a flowchart of execution steps of a method by a vehicle for collecting and transmitting data received from various data sources to a network of roadside nodes that prepare instruction information for the vehicle.

FIGS. 4-6 show flowcharts depicting operations associated with methods 400-600 for analyzing various types of data associated with a roadway. The operations generally include, for example, collecting data from any number of data sources, applying data analytics and machine-learning operations on the data to generate information for vehicles on the roadway, and transmitting the information to vehicles. In this way, the information prepared by the methods 400-600 provide instructions and/or information to the vehicles enable the vehicles to navigate efficiently to destinations and/or safely around hazards.

A mesh network of roadside nodes and hub server(s) collect various types of data from sensors implemented on the array of nodes, vehicles providing vehicle data, and third-party services (e.g., weather data service) providing additional roadway condition information. The data gathered from the various data sources prepare and provide data within a contextually relevant, specified distance on roadways relative to one or more vehicles. The mesh of nodes gathers and analyzes the data related to various aspects of the roadways in real-time (including traffic) and creates data describing or predicting, current or predicted roadway conditions. The processed data is then fed to the pool of one or more nodes and one or more vehicles that are part of a roadway data platform hosting and analyzing the data received from the mesh of nodes.

Generally, when a roadside node detects or connects to a vehicle (whether autonomous or non-autonomous), the vehicle becomes part of the roadway data platform. A server and/or nodes of the roadway data platform analyze the vehicle data in real-time or in historic batches. As an example, the platform may assess a potential driver and the vehicle's route. Then, based on the analysis, the platform generates and tailors a set of roadway data (sometimes referred to as "instruction data") that includes essential information relevant to one or more vehicles, and transmits the instruction data to the one or more vehicles along the road, which the platform may transmit continuously and/or in real-time. This instruction data enables the vehicles to navigate in an optimized manner to their destination, comparing the other autonomous and non-autonomous on the road.

The roadside data platform includes one or more servers and roadside nodes that perform various types of operations for preparing the instruction data, including executing various software programming routines. The server and/or node operations for analyzing the collected data may include software programming that executes any number of hand-crafted or rules-based algorithms. Additionally or alternatively, the server and/or roadside node operations for analyzing the collected data may include software programming that executes one or more machine-learning architectures. For example, the server may execute certain layers of a machine-learning architecture, where the layers define a vehicle classifier or driver identity classifier. As another example, a roadside node may execute certain layers of the same or different machine-learning architecture as above, where the layers define an object recognition engine or facial recognition engine for identifying a vehicle or recognize the features of a face. Further examples of software algorithmic functions are found below.

In some embodiments, the data analytics performed by devices of the roadway data platform include roadside physical layout recognition or prediction (i.e., physical layout engine). The data platform utilizes an array of sensors, cameras, radar, Lidar, or any similar sensors or equipment installed on the server or the mesh network. The platform collects the environment data and traffic data from other sources, including from other vehicles on the road, such as the sensor data of autonomous vehicles on the road, and third-party data services.

As an example, using precise laser and image processing, the data platform will recognize and locate vehicles, objects, and pedestrians, among other physical objects. By implementing sets of calculations, AI, and ML, the data platform may estimate the real-time coordinates of each object on the roads. In the case of any physical obstruction of the line of sight of any sensor, or failure of any node's sensor, the server may execute ML and AI algorithms to predict the location of the vehicles based on the previously captured metrics via prior nodes or any other data sources. In this way, the functions may address the sensor's potential blind spot in capturing data and developing a representational layout of the roadway.

In some embodiments, the data analytics include vehicle classification by a vehicle classifier of the machine-learning architecture. The node sensors or server actively detect and read vehicle license plates on the roads. Then, the system checks the database to see whether that license plate had already been registered with the platform database. If yes, the associated profile for the vehicle will be fetched, and the newly collected data of the vehicle will be amended to the existing profile in the platform database. On the other hand, if the plate is not in the database, a new profile will be created in the system. All the vehicle information will be stored in that profile. By processing the data using AI and ML, the platform algorithm will identify the vehicle classification. Then it assigns the type of vehicles to profile (cars, trucks, motorcycles, make, model, color, commercial, private, etc.).

In some cases, the platform may determine that a vehicle is autonomous at any time if the vehicle requests data from a platform API at that time. Even if an autonomous-equipped vehicle does not make a data request, the platform does not consider that vehicle as autonomous at that time (as autonomous-equipped vehicles may be driven in manual mode at any time). The machine-learning architecture may classify autonomous vehicles separate categories: the autonomous that share their data (including their sensor data, travel data, etc.) with the platform, and the autonomous vehicles that only receive data from the platform without sharing information with the platform database.

In addition or alternatively to detecting autonomous vehicles, the platform may detect multiple types of non-autonomous vehicles. One type of non-autonomous vehicle may be a vehicle that is not equipped with any sensory package and physically is not capable of operating autonomously. Another type of a non-autonomous vehicle may be a vehicle that has the capability to operate autonomously but that is not configured to communicate with the platform. The platform may detect a vehicle is not equipped to operate autonomously by transmitting a signal to the vehicle and determining a defined time has elapsed without receiving a response. The platform may determine a vehicle is capable but not configured to communicate with the platform by detecting an address or signal of a computer operating on the vehicle but not receiving a response to a communication session request (e.g., a SYN packet) from the computer and/or not receiving a request from the vehicle itself.

In some embodiments, the data analytics may include driver classification by a driver classifier executed by the machine-learning architecture. Often, multiple drivers access and drive a given vehicle over a period of time. The data platform executes AI and ML to classify the potential drivers and assign a driver profile to that known vehicle based on the driving characteristics, habits, and patterns and assigns a score to that driver. Then the data platform may tailor the outputted data to match that driver's habits and characteristics, and the data will be associated with the vehicle and/or transmitted to other vehicles within a given distance relative to the driver.

In some embodiments, the data analytics includes a route prediction engine performed by layers of the machine-learning architecture. The platform may predict the route that the known vehicle with the known classified driver will take at any time. As mentioned in an earlier example, Vehicle X, driven by Driver A, may periodically enter highway I-95 from Exit 16, at 8:00 AM, and travels to Exit 14. At the end of the day, at 5:00 PM, then Vehicle X takes Exit 14 to enter I-95, and then takes Exit 16 to exit the highway. As a result, the route prediction engine determines a pattern of Vehicle X, driven by Driver A, on weekdays.

In some embodiments, the data analytics includes generating a driver score for a given driver. After the platform classified the vehicle and the associated driver based on, for example, the driver's travel history, the data analytics software generates a unique driver score and assigns the driver score to the driver for any defined timeframe. The travel history includes driving time of the day, different days of the week, different weeks of the year, etc. In some cases, the platform database stores the travel history in a driver profile, along with the driver score or history of driver scores for the driver.

In some embodiments, the data analytics operations include road classification and/or environment classification, performed by the same or different layers of the machine-learning architecture.

The platform generates and assigns a unique node identifier to each roadway node, which may be based upon or indicate the location (station) where the node is installed. In some cases, if the node is replaced with a new node, that node ID will be reassigned to the new node at the exact location. The server may feed each node with the road and environment data relative to the where the particular node is located. These road and environment data include, but are not limited to, road width, number of lanes, distance from any intersection and exit, distance from rest areas, gas and charging stations, points of interest, and the like. While such information are known about each location, the node utilizes onboard sensors to "spot check" the road and environment conditions for any potential changes in the condition, relative to the prior time that the node determined or reported the information. In case of any detected changes, the node updates a local memory and/or sends a message to a platform server to update a platform database with the updated, changed information.

In some implementations, a node's sensors actively analyzes and detects a road surface and any changing conditions (e.g., road is wet, snowy, icy, defrost solutions, visibility, daylight). Additionally or alternatively, the node detects roadway hazards as physical structures and objects situated in or nearby the roadway (e.g., stopped vehicle, pedestrian, live or dead animals, uneven surface, damaged road surface, road or lane closure, active construction, school bus, emergency vehicles). The machine-learning architecture may execute computer vision and/or object recognition operations to perform these operations. This information is reported to the platform database, in real-time or at a predetermined interval.

Based on the geographical location of the nodes, each node receives the traffic control device information for traffic devices situated nearby (e.g., traffic signals, stop signs, pedestrian lines, etc.). Each node actively monitors the traffic control devices nearby and feeds the data to the autonomous vehicles navigate based on their relative distance to that traffic device. For example, the node detects the traffic light pattern and feeds the data to the autonomous vehicles approaching the intersection to modify speed accordingly.

In some embodiments, the platform include a road hazard or emergency registry. The nodes may actively scan and detects any dangerous situations on the roads. The algorithm can also detect ongoing reckless driving, including drunk driving patterns. The data analytics may predict potential reckless driving situations using ML and AI. For example, as a driver cuts off another driver, the machine-learning architecture detects the possible road rage incident, which may cause reckless driving. The platform generate flag and notify surrounding vehicles of the potential hazards. The platform may further optimize the data in a way that avoids potential accidents. The data analytics may further detect "on-duty" public safety vehicles (e.g., a firefighter truck with the siren on) and notify the surrounding vehicle to, for example, yield to the approaching on-duty public safety vehicle. The platform analytics may further detect the on-duty school buses and notify the surrounding vehicles to take the appropriate action based on the local laws or prepare an alternative route navigating around the school bus.

FIG. 4 shows a flowchart of execution steps of a method 400 for collecting and analyzing data received from various data sources (e.g., roadside nodes, vehicles, databases, external data sources) and preparing instruction information for one or more vehicles. For ease of description and understanding, a centralized server computer (such as an analytic server 202 of FIG. 2) executes software programming for performing the method 400 in FIG. 4, though embodiments are not so limited. Processors of any number of electronic devices (e.g., roadside nodes, modules, servers, vehicles) may execute some or all of the software programming operations, features, or functions of the method 400. As an example, in some embodiments, the server executes software programming of a machine-learning architecture for performing various data analytics and machine-learning operations on data received from any number of roadside nodes and/or vehicles. In this example, the roadside nodes include processors that execute software for performing the same or different data analytics or machine-learning operations on data from various data sources, such as sensors or other modules of the roadside node, other roadside nodes, or vehicles.

In step 401, the server obtains data from various data sources (e.g., nodes, external data services). The server obtains the data for the vehicle for at least a first node, which is located proximate to the vehicle's location when the vehicle established a wireless communication link with the first node. The server may receive, retrieve, or request data from the various data sources. Non-limiting examples of the data sources include the roadside nodes of the mesh network defining a data platform, vehicles associated with the data platform, and third-party servers of any number of third-party data services In step 403, the server generates physical layout representational model of roadway physical objects. The server may execute computer vision and/or object recognition operations to identify the structures and/or weather condition of the roadway within the field of view of the optical sensor data received from the various roadside nodes. The server may further generate or establish a three-dimensional coordinate system relative to the media image in the field of view of the media data received from the one or more nodes. In some implementations, the server applies the computer vision and/or object recognition operation on the raw media feed. Alternatively, the node applies the computer vision and/or object recognition operations, and the server receives the enriched media data (indicating the recognized objects) and performs downstream operations, such as developing a suggested, optimized route for a vehicle. The physical layout may be a component of roadway condition data generated by the server for downstream operations.

In step 405, the server generates environmental data, which may be a portion of the roadway condition data. The server may receive environmental data from third-party servers of a third-party service (e.g., weather data service). Additionally or alternatively, the server or the nodes may perform computer vision operations for detecting weather conditions changed for a given stretch of road within the purview of the node(s). The nodes may include modules for collecting weather related data, such as thermometers, barometers, wind pinwheels, and the like. The server may receive this weather-related data from weather-related sensors and generates the environmental data for the given expanse of roadway.

In step 407, the server identifies a vehicle and a driver operating the vehicle, and determines driver score information. The server (or node) receives media data for a given vehicle, where the media data includes an image of the vehicle's license plate. The server then applies a computer vision engine on the license plate to predict the particular vehicle in the image data. The server may query a platform database using the license plate number to determine whether the license plate is registered in the platform service for a registered driver or account. If yes, then the server fetches a driver profile or vehicle profile and appends newly collected data in the related data record for the profile. The server may further reference the data in the profile for certain downstream operations. If the platform database does not include a profile associated with the license plate, then the database generates a new profile data record for the vehicle and/or the driver and the newly collected data in the related data record for the new profile.

In some implementations, the server applies layers of the machine-learning architecture to the various types of media data for object recognition and vehicle classification. By processing the data using these AI/ML recognition and classifier engines, the server identifies a vehicle classification (e.g., cars, trucks, motorcycles, make, model, color, commercial, private) for the given vehicle in the media data in the field of view of an optical sensor received from the one or more nodes. The server then assigns the type/class of vehicle to the vehicle profile. Additionally or alternatively, server executes a classifier engine that classifies autonomous vehicles as those that share data and those that do not share data.

The server may apply layers of the machine-learning architecture defining a driver classification engine. The driver classification engine execute a facial recognition engine and classifier layers that recognizes drivers and/or classifies drivers according to other attributes or driving behaviors (e.g., driving characteristics, habits, patterns). The server may determine whether the database includes a driver profile based upon the facial recognition or based upon the vehicle profile of an identified vehicle. In some implementations, the server may further generate one or more driver scores for the driver profile. The driver score may be based upon current driving behaviors and/or historic driving behaviors and driving scores. The server may reference the driver profile information (e.g., driver score(s), driving behaviors) to tailor downstream operations. The server may also update vehicle and driver profiles using the newly collected data and newly generated driver score and behavior data.

In step 409, the server predicts future location of vehicles identified in the roadway, over an upcoming threshold of future time, and relative to a threshold relative distance from a central focal point. The server then identifies any predicted intersections between a particular vehicle and an identified roadway hazard, environmental condition, or other delay.

In step 411, the server generates instruction data for vehicle(s) and transmits the instruction data to vehicle(s). In some cases, the instruction data is merely informative as a message for presentation to a user interface of the vehicle. In some cases, the instruction data includes actual driving instructions for the autonomous vehicle. In such cases, redirecting the car remains subject to the driver's confirmation input via the user interface.

FIG. 5 shows a flowchart of execution steps of a method 500 by roadside nodes for collecting and analyzing data received from various data sources (e.g., roadside nodes, vehicles, databases, external data sources) and preparing instruction information for one or more vehicles. For ease of description and understanding, a roadside node (such as roadside node 102 of FIG. 1A) executes software programming for performing the method 500 in FIG. 5, though embodiments are not so limited. Processors of any number of electronic devices (e.g., roadside nodes, modules, servers, vehicles) may execute some or all of the software programming operations, features, or functions of the method 500. As an example, in some embodiments, a processor of the roadside node executes software programming of a machine-learning architecture for performing various data analytics and machine-learning operations on data received from any number of roadside nodes and/or vehicles. In this example, a central server includes processors that execute software for performing the same or different data analytics or machine-learning operations on data from various data sources, such as sensors or other modules of the roadside node, other roadside nodes, or vehicles.

In step 501, the roadside node detects a vehicle when the roadside node receives one or more wireless communication messages from the vehicle. The roadside node and the vehicle establish a wireless connection according to the wireless communication protocols of the wireless communication standard used to establish the connection. In step 503, the roadside node transmits a message to the server indicating that the roadside node detected the vehicle. The server then associates the vehicle with the roadway computing platform by including vehicle related-data in various functions or storage locations of the system.

In step 505, the node receives or captures various types of data, including sensor data, vehicle data, roadway data, and/or environment data. The node then forwards the various types of data to the server, which performs analytics functions for any number of vehicles and nodes. In step 507, the node receives instruction data received from the server and forwards the instruction data to the vehicle. In some cases, the instruction data is merely informative as a message for presentation to a user interface of the vehicle. In some cases, the instruction data includes actual driving instructions for the autonomous vehicle. In such cases, redirecting the car remains subject to the driver's confirmation input via the user interface.

FIG. 6 shows a flowchart of execution steps of a method 600 of a vehicle for collecting and transmitting data received from various data sources (e.g., vehicle sensors, other vehicles) to a network of roadside nodes that prepare instruction information for the vehicle.

In step 601, a processor of the vehicle establishes a wireless connection with a node using one or more wireless communication protocols. In step 603, the vehicle gathers various types of sensor data and forwards the gathered data as vehicle data to the node(s). In step 605, the vehicle receives instruction data from the same or different node of a data platform system. The instruction data may include visual messages for display to a user interface of the vehicle. Additionally or alternatively, the instruction data may include instructions for automating driving operations of an autonomous vehicle. In such cases, the user interface presents a confirmation prompt to the driver, requesting the driver enter a confirmation input permitting the instruction data to redirect the car.

The foregoing method descriptions and the process flow diagrams are provided merely as illustrative examples and are not intended to require or imply that the operations of the various embodiments must be performed in the order presented. The operations in the foregoing embodiments may be performed in any order. Words such as "then," "next," etc. are not intended to limit the order of the operations; these words are simply used to guide the reader through the description of the methods. Although process flow diagrams may describe the operations as a sequential process, many of the operations can be performed in parallel or concurrently. In addition, the order of the operations may be re-arranged. A process may correspond to a method, a function, a procedure, a subroutine, a subprogram, and the like. When a process corresponds to a function, the process termination may correspond to a return of the function to a calling function or a main function.

The various illustrative logical blocks, modules, circuits, and algorithm operations described in connection with the embodiments disclosed herein may be implemented as electronic hardware, computer software, or combinations of both. To clearly illustrate this interchangeability of hardware and software, various illustrative components, blocks, modules, circuits, and operations have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of this disclosure or the claims.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the claimed features or this disclosure. Thus, the operation and behavior of the systems and methods were described without reference to the specific software code being understood that software and control hardware can be designed to implement the systems and methods based on the description herein.

When implemented in software, the functions may be stored as one or more instructions or code on a non-transitory computer-readable or processor-readable storage medium. The operations of a method or algorithm disclosed herein may be embodied in a processor-executable software module, which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the embodiments described herein and variations thereof. Various modifications to these embodiments will be readily apparent to those skilled in the art, and the generic principles defined herein may be applied to other embodiments without departing from the spirit or scope of the subject matter disclosed herein. Thus, the present disclosure is not intended to be limited to the embodiments shown herein but is to be accorded the widest scope consistent with the following claims and the principles and novel features disclosed herein.

While various aspects and embodiments have been disclosed, other aspects and embodiments are contemplated. The various aspects and embodiments disclosed are for purposes of illustration and are not intended to be limiting, with the true scope and spirit being indicated by the following claims.

What is claimed is:

1. A system for communicating road condition data comprising:

a node housing including a plurality of shelving units, the node housing comprising:

a first shelving unit electrically connected to a removable sensor housing comprising a sensor configured to generate sensor data;

a second shelving unit electrically connected to a removable data processing housing comprising a processor configured to receive the sensor data and vehicle-originated data and apply one or more layers of a machine learning algorithm to the sensor data and the vehicle-originated data to generate at least a portion of vehicle instruction data; and a third shelving unit electrically connected to a removable wireless communication housing comprising a wireless interface circuit configured to receive the vehicle-originated data and to transmit the vehicle instruction data generated by the processor.

2. The system of claim 1, wherein the wireless interface circuit is configured to receive the vehicle-originated data from a first vehicle and transmit the vehicle instruction data to the first vehicle.

3. The system of claim 2, wherein receipt of the vehicle instruction data causes the first vehicle to change a state of operation.

4. The system of claim 1, wherein the node housing is further configured to receive a removable lighting housing comprising a light, the removable lighting housing positioned on a highest shelf of the plurality of shelves.

5. The system of claim 1, wherein the processor is configured to:

establish a connection with a vehicle upon receipt of a connection request from the vehicle;

receive the vehicle-originated data from the vehicle over the connection; and transmit the vehicle instruction data to the vehicle over the connection.

6. The system of claim 5, wherein the processor is configured to:

upon establishing the connection with the vehicle, query a database for an indication as to whether the vehicle is configured to provide vehicle-originated data to the processor; and transmit a request for vehicle-originated data about the vehicle responsive to the query indicating the vehicle is configured to provide vehicle-originated data.

7. The system of claim 1, wherein the processor is configured to:

receive the sensor data from the sensor; and transmit the sensor data to a remote computing device.

8. The system of claim 7, wherein the plurality of interchangeable housings further comprises a fiber connectivity module including fiber optic cabling, wherein the processor is configured to transmit the sensor data to the remote computing device via the fiber optic cabling.

9. The system of claim 7, wherein the processor is configured to receive a second portion of vehicle instruction data from the remote computing device, the second portion of vehicle instruction data generated based at least on the sensor data.

10. The system of claim 7, wherein the wireless interface circuit is configured to transmit the vehicle instruction data to a vehicle by transmitting an indication of an upcoming obstacle to the vehicle.

11. A system for communicating road condition data comprising:

a non-transitory computer readable medium containing instructions that when executed by a processor cause the processor to:

receive vehicle data associated with a first vehicle from a first node of a plurality of nodes defining a mesh network;

receive sensor data from a second roadside node of the plurality of nodes;

apply one or more layers of a machine learning algorithm to the sensor data and the vehicle data associated with the first vehicle to generate vehicle instruction data for the first vehicle; and transmit the vehicle instruction data for the first vehicle to one or more roadside nodes of the plurality of nodes, wherein the vehicle instruction data contains instructions to cause the one or more roadside nodes to forward the vehicle instruction data to the first vehicle.

12. The system of claim 11, wherein the processor is configured to transmit the vehicle instruction data to the one or more nodes by transmitting the vehicle instruction data to a third node located geographically between the first node and the second node.

13. The system of claim 11, wherein the processor is configured to transmit the vehicle instruction data to the one or more nodes by transmitting an indication of an obstacle that is detectable by sensors of the second node but not by any sensors of the first node.

14. The system of claim 11, wherein the processor is configured to transmit the vehicle instruction data to the one or more nodes by transmitting the vehicle instruction data to a third node located geographically between the first node and the second node.

15. A system for communicating road condition data, the system comprising:

a computer comprising a processor and non-transitory computer readable medium containing instructions executable by the processor that when executed by the processor the computer is configured to:

receive node sensor data from one or more roadside nodes and vehicle-originated data for one or more vehicles;

determine a current vehicle location of a first vehicle based upon the vehicle-originated data and a node location of a first roadside node of the one or more roadside nodes in communication with the vehicle;

determine a road condition at a second node of the one or more road-side nodes and a condition location of the road condition by applying one or more layers of a machine learning algorithm on the node sensor data and the vehicle-originated data;

determine a predicted intersection between a predicted future location of the first vehicle and the roadway condition;

generate a vehicle notification indicating the predicted intersection; and transmit the vehicle instruction to the first vehicle via the second node.

16. The system according to claim 15, wherein the computer is further configured to determine a vehicle type of the first vehicle by applying a vehicle recognition engine of the machine-learning architecture on a set of vehicle attributes received in the node sensor data and the vehicle-originated data.

17. The system according to claim 15, wherein the computer is further configured to:

determine a license plate associated with the first vehicle based upon a license plate image of the node sensor data; and query a database for a vehicle profile associated with the license plate.

18. The system according to claim 15, wherein the computer is further configured to determine a driver score for a driver of the first vehicle according to one or more attributes of the driver behavior.

19. The system according to claim 18, wherein the computer is further configured to identify the driver as a hazard responsive to determining that the driver score satisfying a hazardous driver threshold.

20. The system according to claim 15 wherein the computer is further configured to determine an identity of the driver based upon an identity of the first vehicle and the one or more attributes of the driver behavior.

\*    \*    \*    \*    \*